United States Patent
Mustafa et al.

(10) Patent No.: US 12,058,208 B2
(45) Date of Patent: Aug. 6, 2024

(54) TECHNIQUES TO ACHIEVE CACHE COHERENCY ACROSS DISTRIBUTED STORAGE CLUSTERS

(71) Applicant: eBay Inc., San Jose, CA (US)

(72) Inventors: Tariq Mustafa, Fremont, CA (US); Mohiuddin Abdul Qader, Sunnyvale, CA (US); Jiankun Yu, Pleasanton, CA (US); Sami Ben-Romdhane, Los Altos, CA (US); Ravi Nagarjun Akella, San Francisco, CA (US)

(73) Assignee: EBAY INC., San Jose, CA (US)

( * ) Notice: Subject to any disclaimer, the term of this patent is extended or adjusted under 35 U.S.C. 154(b) by 304 days.

(21) Appl. No.: 17/543,064

(22) Filed: Dec. 6, 2021

(65) Prior Publication Data
US 2023/0179655 A1    Jun. 8, 2023

(51) Int. Cl.
*H04L 67/104* (2022.01)
*G06F 16/27* (2019.01)
(Continued)

(52) U.S. Cl.
CPC .......... *H04L 67/1051* (2013.01); *G06F 16/27* (2019.01); *H04L 67/1034* (2013.01); *H04L 67/1093* (2013.01)

(58) Field of Classification Search
CPC ............. H04L 67/1051; H04L 67/1034; H04L 67/1093; H04L 41/0663; H04L 67/1095;
(Continued)

(56) References Cited

U.S. PATENT DOCUMENTS

| 8,473,775 B1 | 6/2013 | Helmick et al. |
| 10,067,843 B1 | 9/2018 | Yochai et al. |

(Continued)

FOREIGN PATENT DOCUMENTS

| CN | 202211587545.8 | 12/2022 |
| CN | 116233146 | 6/2023 |

(Continued)

OTHER PUBLICATIONS

European Patent Office, "European search report," issued in connection with European Patent Application No. 22211078.5 dated Apr. 17, 2023 (10 pages).

(Continued)

*Primary Examiner* — Zhuo H Li
(74) *Attorney, Agent, or Firm* — SCHWEGMAN LUNDBERG & WOESSNER, P.A.

(57) ABSTRACT

A leader control plane node of a set of control plane nodes of a node cluster, may receive a request to store data in a distributed storage system including a set of access manager nodes. The leader control plane node may generate cache data identifying an instruction from the leader control plane node to one or more access manager nodes managed by the leader control plane node of the plurality of access manager nodes, the instruction instructing the one or more access manager nodes to store the data indicated in the request. The leader control plane node may then transmit a replication instruction to one or more follower control plane nodes of the plurality of control plane nodes to replicate the cache data in a respective cache of the one or more follower control plane nodes.

20 Claims, 12 Drawing Sheets

(51) Int. Cl.
  *H04L 67/1034* (2022.01)
  *H04L 67/1087* (2022.01)
(58) Field of Classification Search
  CPC ... H04L 67/1097; G06F 16/27; G06F 16/275; G06F 16/24552; G06F 3/0656; G06F 3/067
  See application file for complete search history.

(56) References Cited

U.S. PATENT DOCUMENTS

| | | | |
|---|---|---|---|
| 2012/0173541 A1* | 7/2012 | Venkataramani | ... G06F 12/0844 707/769 |
| 2017/0286516 A1 | 10/2017 | Horowitz et al. | |
| 2019/0146884 A1* | 5/2019 | Gangadharappa | .. G06F 11/2094 711/162 |
| 2021/0019237 A1* | 1/2021 | Karr | ........................ G06F 3/0647 |
| 2021/0303160 A1* | 9/2021 | Lieblich | .................. G06F 3/067 |
| 2023/0305726 A1* | 9/2023 | Ben Romdhane | .... G06F 3/0659 711/154 |

FOREIGN PATENT DOCUMENTS

| | | |
|---|---|---|
| EP | 22211078.5 | 12/2022 |
| EP | 4191429 | 6/2023 |

OTHER PUBLICATIONS

Ahn et al., Jungle: Towards Dynamically Adjustable Key-Value Store by Combining LSM-Tree and Copy-On-Write B+-Tree, In 11th USENIX Workshop on Hot Topics in Storage and File Systems (HotStorage 19), 2019, 7 Pages.

Apache Kudu—Fast Analytics on Fast Data, Retrieved Form Internet URL: <https://kudu.apache.org/>, Accessed on Mar. 7, 2022, 2 pages.

Ardekani et al., A Self-Configurable Geo-Replicated Cloud Storage System, In 11th USENIX Symposium on Operating Systems Design and Implementation (OSDI 14), 2014, 15 pages.

Balalaie et al., Microservices Architecture Enables DevOps, Migration to a cloud-native architecture, IEEE Software, vol. 33 Issue: 3, 2016, 11 pages.

Cao et al., PolarFS: An Ultra-low Latency and Failure Resilient Distributed File System for Shared Storage Cloud Database, Proceedings of the VLDB Endowment, vol. 11, No. 12, DOI: https://doi.org/10.14778/3229863.3229872, 2018, 14 pages.

Carbone et al., Apache Flink™: Stream and Batch Processing in a Single Engine, Bulletin of the IEEE Computer Society Technical Committee on Data Engineering, 36(4), 2015, 11 pages.

EBay/NuRaft: C++ Implementation of Raft Core Logic as a Replication Library, retrieved from internet URL: < https://github.com/eBay/NuRaft>, accessed on Mar. 7, 2022, 6 Pages.

Grafana: The Open Observability Platform, Grafana Labs, Retrieved From Internet URL: <https://grafana.com/>, accessed on Mar. 7, 2022, 7 pages.

GRBC, A High Performance, Open-Source Universal RPC Framework, retrieved from Internet URL :<https://grpc.io/>, accessed on Mar. 7, 2022, 3 pages.

Hoefler et al., Distributing the Data Plane for Remote Storage Access, In 15th Workshop on Hot Topics in Operating Systems (HotOS fXVg), 2015, 8 pages.

Howard et al., Flexible Paxos: Quorum Intersection Revisited, arXiv preprint arXiv:1608.06696, 2016, 20 pages.

Jararweh et al., Software Defined Cloud: Survey, System and Evaluation, Future Generation Computer Systems, 58 (2016), 19 pages.

Kubernetes, Production-Grade Container Orchestration, retrieved from internet URL:<https://kubernetes.io/>, accessed on Mar. 7, 2022, 10 pages.

Kulkarni et al., Cloud Storage Architecture, In 2012 7th International Conference On Telecommunication Systems, Services, And Applications (TSSA), IEEE, 2012, 6 pages.

Leslie, The Part-Time Parliament, ACM Transactions on Computer Systems (TOCS), vol. 16, No. 2, May 1998, 37 pages.

Leymann et al., Native Cloud Applications: Why Virtual Machines, Images and Containers Miss the Point!, International Conference on Cloud Computing and Services Science. Springer, Cham, 2016, 9 pages.

Li et al., Distributed Metadata Management Scheme in Cloud Computing, In 2011 6th International Conference on Pervasive Computing and Applications, IEEE, 2011, 7 pages.

Liu et al., CFS: a Distributed File System for Large Scale Container Platforms, In Proceedings of the 2019 International Conference on Management of Data, ACM, 2019, 14 pages.

Ongaro et al., In Search of an Understandable Consensus Algorithm, In 2014 USENIX Annual Technical Conference (Usenix ATC 14), 2014, 15 pages.

OpenEBS, Kubernetes Storage Simplified, retrieved from internet URL:<https://openebs.io/>, accessed on Oct. 27, 2022, 3pages.

Prometheus—Monitoring System & Time Series Database, From Metrics to Insight: Power Your Metrics and Alerting with the Leading Open-Source Monitoring Solution, retrieved from internet URL:<https://prometheus.io/>, accessed on Mar. 7, 2022, 6 pages.

Rook, Open-Source, Cloud-Native Storage for Kubernetes, retrieved from internet URL:<https://rook.io/>, accessed on Oct. 27, 2022, 6 pages.

Sourceforge, Generic SCSI Target Subsystem for Linux, retrieved from internet URL:<https://sourceforge.net/p/scst/svn/HEAD/tree/>, accessed on Mar. 7, 2022, 1 pages.

SPDK, Build Ultra High-Performance Storage Applications with the Storage Performance Development Kit, retrieved from internet URL:<https://spdk.io/>, accessed on Oct. 27, 2022, 5 pages.

Thereska et al., IOFlow: a Software-Defined Storage Architecture, In Proceedings of the Twenty-Fourth ACM Symposium on Operating Systems Principles, 2013, 15 pages.

Thomson et al., CalvinFS: Consistent WAN Replication and Scalable Metadata Management for Distributed File Systems, In 13th USENIX Conference on File and Storage Technologies (FAST 15), 2015, 14 pages.

Tran et al., Online Migration for Geo-Distributed Storage Systems, In USENIX Annual Technical Conference, 2011, 16 pages.

Uscilab, Cereal—A C++11 library for serialization, retrieved from internet URL:<https://uscilab.github.io/cereal/>, accessed on Jul. 3, 2022, 5 pages.

Wang et al., Building a Replicated Logging System with Apache Kafka, Proceedings of the VLDB Endowment, vol. 8, No. 12, 2015, 2 pages.

Wires et al., Mirador: an Active Control Plane for Datacenter Storage, In 15th USENIX Conference on File and Storage Technologies (FAST 17), 2017, 16 pages.

* cited by examiner

US 12,058,208 B2

TECHNIQUES TO ACHIEVE CACHE COHERENCY ACROSS DISTRIBUTED STORAGE CLUSTERS

FIELD OF TECHNOLOGY

The present disclosure relates generally to server systems and data processing, and more specifically to techniques to achieve cache coherency across distributed storage clusters.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.). Computer networks permit the transport of data between interconnected computers. Techniques for data storage using a distributed storage cluster may be improved.

SUMMARY

A method for data storage is described. The method may include receiving, at a leader control plane node of a plurality of control plane nodes of a node cluster, a request to store data in a distributed storage system comprising a plurality of access manager nodes, generating, by the leader control plane node, cache data identifying an instruction from the leader control plane node to one or more access manager nodes managed by the leader control plane node of the plurality of access manager nodes, the instruction instructing the one or more access manager nodes to store the data indicated in the request, and transmitting, by the leader control plane node, a replication instruction to one or more follower control plane nodes of the plurality of control plane nodes to replicate the cache data in a respective cache of the one or more follower control plane nodes.

An apparatus for data storage is described. The apparatus may include a processor, memory coupled with the processor, and instructions stored in the memory. The instructions may be executable by the processor to cause the apparatus to receive, at a leader control plane node of a plurality of control plane nodes of a node cluster, a request to store data in a distributed storage system comprising a plurality of access manager nodes, generate, by the leader control plane node, cache data identifying an instruction from the leader control plane node to one or more access manager nodes managed by the leader control plane node of the plurality of access manager nodes, the instruction instructing the one or more access manager nodes to store the data indicated in the request, and transmit, by the leader control plane node, a replication instruction to one or more follower control plane nodes of the plurality of control plane nodes to replicate the cache data in a respective cache of the one or more follower control plane nodes.

Another apparatus for data storage is described. The apparatus may include means for receiving, at a leader control plane node of a plurality of control plane nodes of a node cluster, a request to store data in a distributed storage system comprising a plurality of access manager nodes, means for generating, by the leader control plane node, cache data identifying an instruction from the leader control plane node to one or more access manager nodes managed by the leader control plane node of the plurality of access manager nodes, the instruction instructing the one or more access manager nodes to store the data indicated in the request, and means for transmitting, by the leader control plane node, a replication instruction to one or more follower control plane nodes of the plurality of control plane nodes to replicate the cache data in a respective cache of the one or more follower control plane nodes.

A non-transitory computer-readable medium storing code for data storage is described. The code may include instructions executable by a processor to receive, at a leader control plane node of a plurality of control plane nodes of a node cluster, a request to store data in a distributed storage system comprising a plurality of access manager nodes, generate, by the leader control plane node, cache data identifying an instruction from the leader control plane node to one or more access manager nodes managed by the leader control plane node of the plurality of access manager nodes, the instruction instructing the one or more access manager nodes to store the data indicated in the request, and transmit, by the leader control plane node, a replication instruction to one or more follower control plane nodes of the plurality of control plane nodes to replicate the cache data in a respective cache of the one or more follower control plane nodes.

Some examples of the method, apparatuses, and non-transitory computer-readable medium described herein may further include operations, features, means, or instructions for instructing the one or more access manager nodes to store the data in the distributed storage system in accordance with the instruction. In some examples of the method, apparatuses, and non-transitory computer-readable medium described herein, generating the cache data may include operations, features, means, or instructions for creating, in the cache of the leader control plane node, a replication log entry comprising the instruction for storing the data indicated in the request by the one or more access manager nodes of the distributed storage system.

Some examples of the method, apparatuses, and non-transitory computer-readable medium described herein may further include operations, features, means, or instructions for receiving, from the one or more access manager nodes, a confirmation message indicating that the data indicated in the request may have been stored data by the one or more access manager nodes and updating the replication log entry of the cache to indicate that the data indicated in the request may have been stored data by the one or more access manager nodes of the distributed storage system.

Some examples of the method, apparatuses, and non-transitory computer-readable medium described herein may further include operations, features, means, or instructions for determining a failure of the leader control plane node and transmitting, to a follower control plane node of the one or more follower control plane nodes, an indication that the follower control plane node may be elected to be a new leader control plane node based at least in part on failure of the leader control plane node.

In some examples of the method, apparatuses, and non-transitory computer-readable medium described herein, the cache data indicates one or more access manager nodes of the distributed storage system managed by the leader control plane node, or one or more storage volumes of the distributed storage system managed by the leader control plane node, or one or more storage pools of the distributed storage system managed by the leader control plane node, or any combination thereof. In some examples of the method, apparatuses, and non-transitory computer-readable medium described herein, the request to store data in the distributed storage system comprises a write request.

A method for data storage is described. The method may include receiving, from a leader control plane node at a follower control plane node of a plurality of control plane nodes of a node cluster, a replication instruction to replicate cache data of the leader control plane node in a cache of the follower control plane node, receiving, at the follower control plane node, an indication that the follower control plane node is elected to be a new leader control plane node based at least in part on failure of the leader control plane node, processing, by the new leader control plane node, the cache to retrieve an instruction from the leader control plane node to one or more access manager nodes of a distributed storage system, the instruction instructing the one or more access manager nodes managed by the leader control plane node to store data indicated in a request, and instructing the one or more access manager nodes of the distributed storage system to store the data in accordance with the instruction retrieved from the cache.

An apparatus for data storage is described. The apparatus may include a processor, memory coupled with the processor, and instructions stored in the memory. The instructions may be executable by the processor to cause the apparatus to receive, from a leader control plane node at a follower control plane node of a plurality of control plane nodes of a node cluster, a replication instruction to replicate cache data of the leader control plane node in a cache of the follower control plane node, receive, at the follower control plane node, an indication that the follower control plane node is elected to be a new leader control plane node based at least in part on failure of the leader control plane node, process, by the new leader control plane node, the cache to retrieve an instruction from the leader control plane node to one or more access manager nodes of a distributed storage system, the instruction instructing the one or more access manager nodes managed by the leader control plane node to store data indicated in a request, and instruct the one or more access manager nodes of the distributed storage system to store the data in accordance with the instruction retrieved from the cache.

Another apparatus for data storage is described. The apparatus may include means for receiving, from a leader control plane node at a follower control plane node of a plurality of control plane nodes of a node cluster, a replication instruction to replicate cache data of the leader control plane node in a cache of the follower control plane node, means for receiving, at the follower control plane node, an indication that the follower control plane node is elected to be a new leader control plane node based at least in part on failure of the leader control plane node, means for processing, by the new leader control plane node, the cache to retrieve an instruction from the leader control plane node to one or more access manager nodes of a distributed storage system, the instruction instructing the one or more access manager nodes managed by the leader control plane node to store data indicated in a request, and means for instructing the one or more access manager nodes of the distributed storage system to store the data in accordance with the instruction retrieved from the cache.

A non-transitory computer-readable medium storing code for data storage is described. The code may include instructions executable by a processor to receive, from a leader control plane node at a follower control plane node of a plurality of control plane nodes of a node cluster, a replication instruction to replicate cache data of the leader control plane node in a cache of the follower control plane node, receive, at the follower control plane node, an indication that the follower control plane node is elected to be a new leader control plane node based at least in part on failure of the leader control plane node, process, by the new leader control plane node, the cache to retrieve an instruction from the leader control plane node to one or more access manager nodes of a distributed storage system, the instruction instructing the one or more access manager nodes managed by the leader control plane node to store data indicated in a request, and instruct the one or more access manager nodes of the distributed storage system to store the data in accordance with the instruction retrieved from the cache.

Some examples of the method, apparatuses, and non-transitory computer-readable medium described herein may further include operations, features, means, or instructions for processing the cache to identify a replication log entry comprising the instruction for storing the data indicated in the request via the one or more access manager nodes of the distributed storage system and instructing the one or more access manager nodes of the distributed storage system to store the data indicated in the request based at least in part on the replication log entry.

Some examples of the method, apparatuses, and non-transitory computer-readable medium described herein may further include operations, features, means, or instructions for receiving, from the one or more access manager nodes, a confirmation message indicating that the data indicated in the request may have been stored data by the one or more access manager nodes.

Some examples of the method, apparatuses, and non-transitory computer-readable medium described herein may further include operations, features, means, or instructions for receiving, at the new leader control plane node, a second request to store data in the one or more access manager nodes, generating, by the new leader control plane node, a second cache data identifying a second instruction from the new leader control plane node to the one or more access manager nodes, the second instruction instructing the one or more access manager nodes to store the data indicated in the second request, and transmitting, by the new leader control plane node, a second replication instruction to one or more follower control plane nodes of the new leader control plane node to replicate the second cache data in a respective cache of the one or more follower control plane nodes.

Some examples of the method, apparatuses, and non-transitory computer-readable medium described herein may further include operations, features, means, or instructions for instructing the one or more access manager nodes to store the data in the distributed storage system in accordance with the second instruction.

In some examples of the method, apparatuses, and non-transitory computer-readable medium described herein, the cache data indicates one or more access manager nodes of the distributed storage system managed by the leader control plane node, or one or more storage volumes of the distributed storage system managed by the leader control plane node, or one or more storage pools of the distributed storage system managed by the leader control plane node, or any combination thereof. In some examples of the method, apparatuses, and non-transitory computer-readable medium described herein, a second cache of the new leader control plane node is configured to achieve cluster fail over within a defined amount of time.

DETAILED DESCRIPTION

Figure 1:
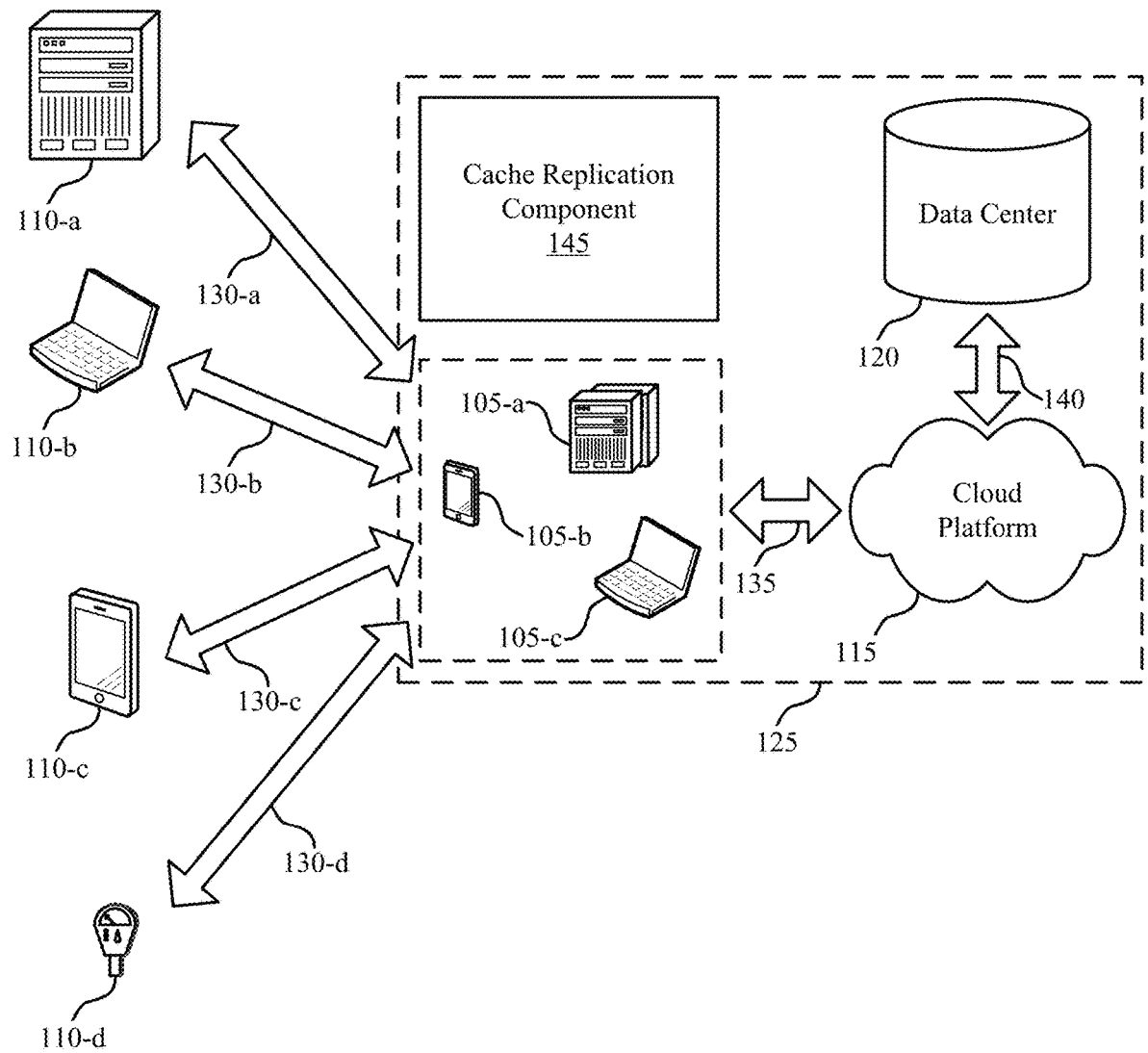
FIG. 1 illustrates an example of a data storage system that supports techniques to achieve cache coherency across distributed storage clusters in accordance with aspects of the present disclosure.

A platform of an online marketplace may use a distributed storage architecture to store data that scales as the amount of data increases. This storage architecture is designed with the goal of providing high throughput and low latency storage access. In some examples, the storage architecture may be implemented using a neuron cluster that includes a set of control plane nodes that store and replicate data for storage across data centers at different geographic locations. The set of control plane nodes may coordinate with a set of data plane nodes, referred to herein as access manager storage nodes. The access manager nodes may be used for storing data in underlying hard disks control by a respective access manager storage node. The neuron cluster may be designed continue to operate even if one of the control plane nodes fail. The neuron cluster may use a distributed consensus protocol to elect a leader control plane node. With a leader control plane node elected, the other control plane nodes of the cluster are referred to as follower control plane nodes.

In some examples, the leader control plane node may manage a subset of the storage nodes. Additionally or alternatively, the leader control plane node may instruct its storage nodes to perform data placement on underlying storage disks, and may coordinate with its storage nodes to retrieve data. The leader control plane node may coordinate with its subset of access manager storage nodes to store data at a first data center, and may coordinate with follower control plane nodes to replicate the data for storage of the data by a second subset of the access manager nodes at a second data center. If there is a failure of the control plane node, then the neuron cluster may elect one the follower control plane nodes to assume the leadership role. In some data storage systems when a leader fails, a cluster manager may read a local database, and reconstruct at least some or all cluster states of the failed leader control plane node. The cluster manager may send a leader change request to the storage nodes indicating that the leader has been changed from the old leader to a new control plane node. In addition, the cluster manager may provide information associated with the new leader to the storage nodes. The storage nodes may use this information for future communication with the new leader. However, this reconfiguration may take a long time (e.g., several minutes) and during this time, the storage nodes may not be able to communicate with the neuron cluster, thus contributing to latency.

One or more aspects of the present disclosure may provide for replication of cache data across multiple control plane nodes. The cache data may include a mapping between incoming data and an access manager node storing the data. In some examples, a neuron cluster may include multiple control plane nodes (referred to as "Neuron nodes"), where one control plane node may be a leader control plane node and the remaining control plane nodes may be follower control plane nodes. A leader control plane node may receive a request to store data in a distributed storage system. Upon receiving the request, the leader control plane node may generate and store cache data in its cache identifying instructions for storing or retrieving the data indicated in the request by one or more of access manager storage nodes of the distributed storage system at a first data center. For instance, the cache data stored in the cache may be a set of log entries indicating a set of one or more operations being performed by the leader control plane node and its access manager storage nodes, and may indicate whether a particular operation has been completed. The leader control plane node may also replicate the request to cause the follower nodes to perform the same operation with their access manager storage nodes of the distributed storage system at a second data center, such that the data is replicated and stored at different data centers.

According to some aspects, the leader control plane node may replicate its cache data for storage to a cache of one or more follower control plane nodes. By replicating the access instructions in each cache of each of the follower control plane nodes, the need to reconstruct at least one or all cluster states by a cluster manager when a leader fails prior to implementing a leader change is reduced or eliminated, and so is the corresponding latency. As described herein, each of the follower control plane nodes may include a replica of the cache of the leader control plane node (e.g., the caches may be coherent across the nodes of the cluster). In some examples, the new leader node may thus use its cache to continue from where the old leader node left off, resulting in reduced latency. As such, a failover response time by replicating a leader cache at each follower node provides a reduced latency during a change in leader, such as, for example, when the current leader node fails. Thus, maintaining the cache coherency between leader control plane node and follower control plane nodes may result in faster leader switching when a failure of a leader node occurs thereby enabling the distributed storage system to continue with nominal interruption to storage replication operations.

Aspects of the disclosure are initially described in the context of an environment supporting an on-demand database service. Aspects of the disclosure are further described in the context of a storage architecture, a recovery architecture, a distributed consensus protocol, and a process flow. Aspects of the disclosure are further illustrated by and described with reference to apparatus diagrams, system diagrams, and flowcharts that relate to techniques to achieve cache coherency across distributed storage clusters.

FIG. 1 illustrates an example of a system 100 for cloud computing that supports techniques to achieve cache coherency across distributed storage clusters in accordance with various aspects of the present disclosure. The system 100 includes cloud clients 105, user devices 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a computing device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be part of a business, an enterprise, a non-profit, a startup, or another organization type.

A cloud client 105 may facilitate communication between the data center 120 and one or multiple user devices 110 to implement an online marketplace. The network connection 130 may include communications, opportunities, purchases, sales, or other interaction between a cloud client 105 and a user device 110. A cloud client 105 may access cloud platform 115 to store, manage, and process the data communicated via one or more network connections 130. In some cases, the cloud client 105 may have an associated security or permission level. A cloud client 105 may have access to certain applications, data, and database information within cloud platform 115 based on the associated security or permission level, and may not have access to others.

The user device 110 may interact with the cloud client 105 over network connection 130. The network may implement transfer control protocol and internet protocol (TCP/IP), such as the Internet, or may implement other network protocols. The network connection 130 may facilitate transport of data via email, web, text messages, mail, or other appropriate form of electronic interaction (e.g., network connections 130-a, 130-b, 130-c, and 130-d) via a computer network. In an example, the user device 110 may be computing device such as a smartphone 110-a, a laptop 110-b, and also may be a server 110-c or a sensor 110-d. In other cases, the user device 110 may be another computing system. In some cases, the user device 110 may be operated by a user or group of users. The user or group of users may be a customer, associated with a business, a manufacturer, or other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support an online application. This may include support for sales between buyers and sellers operating user devices 110, service, marketing of products posted by buyers, community interactions between buyers and sellers, analytics, such as user-interaction metrics, applications (e.g., computer vision and machine learning), and the Internet of Things. Cloud platform 115 may receive data associated with generation of an online marketplace from the cloud client 105 over network connection 135, and may store and analyze the data. In some cases, cloud platform 115 may receive data directly from a user device 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or via network connection 130 between a user device 110 and the cloud client 105. Data center 120 may utilize multiple redundancies for security purposes. In some cases, the data stored at data center 120 may be backed up by copies of the data at a different data center (not pictured).

Server system 125 may include cloud clients 105, cloud platform 115, cache replication component 145, and data center 120 that may coordinate with cloud platform 115 and data center 120 to implement an online marketplace. In some cases, data processing may occur at one or more of the components of server system 125, or at a combination of these components. In some cases, servers may perform the data processing. The servers may be a cloud client 105 or located at data center 120.

The cache replication component 145 may communicate with cloud platform 115 via connection 155, and may also communicate with data center 120 via connection 150. The cache replication component 145 may receive signals and inputs from user device 110 via cloud clients 105 and via cloud platform 115 or data center 120.

Some ecommerce systems may provide a marketplace where billions of products are listed from millions of sellers. The amount of new data creation may continuously grow and a large amount of new data may be created every day. Such data may include product listing information, media files, various logs generated by services in production, machine learning, and analytical workloads, and/or other secondary sources that monitor these transactions. In some instances, some of the data may be ephemeral while others may be durable for a long time to satisfy regulatory compliances. Such different use-cases may be associated with different service level objectives from the underlying storage in terms of latency and throughput. In some aspects, some storage systems may provide a block storage access.

Some conventional data storage solutions may provide for a data storage architecture including multiple storage nodes. The data storage architecture may be implemented by a neuron cluster including a set of control plane nodes. The set of control pane nodes may store data in one or more access manager storage nodes. A node, as described herein, may be implemented in hardware, software, or a combination of both. In addition, the neuron cluster may elect one of the control plane nodes as a leader control plane node and the remaining control plane nodes are designated as follower control plane nodes. In some examples, the leader control plane node may coordinate with its subset of access manager storage nodes to store data at a first data center, and may coordinate with follower control plane nodes to replicate the data for storage of the data by a second subset of the access manager nodes at a second data center. However, if a leader control plane node fails, it may be challenging to seamlessly continue data storage operation. That is, upon failure of a leader control plane node, the neuron cluster elects a new control plane node as the new leader. In such cases, the newly elected control plane node may be unaware of the cache of the prior leader control plane node. Thus, when a leader is changed from an old leader to a new leader, the reconfiguration may take a long time, thus contributing to latency.

In contrast, system 100 implements procedures and techniques to achieve cache coherency across distributed storage clusters. Specifically, server system 125 may implement operations similar to those as described herein. One or more components of server system 125, including cache replication component 145, as described herein, may operate to perform cache replication across multiple storage nodes. The cache replication component 145 within server system 125 may receive, at a leader control plane node of a set of control plane nodes of a node cluster, a request to store data in a distributed storage system including a set of access manager nodes. The cache replication component 145 within server system 125 may generate, by the leader control plane node, cache data identifying an instruction from the leader control plane node to one or more access manager nodes managed by the leader control plane node of the set of access manager nodes. In some examples, the instruction may instruct the one or more access manager nodes to store the data indicated in the request. The server system 125 and cache replication component 145 may transmit, by the leader control plane node, a replication instruction to one or more follower control plane nodes of the set of control plane nodes to replicate the cache data in a respective cache of the one or more follower control plane nodes. The cache data may include a mapping between incoming data and an access manager node storing the data. In particular, the cache data may include an instruction for an access manager node to store data. The instruction may be in a form of a replication log entry. For high availability and fault tolerance, a cluster manager (implemented by the cache replication component 145) may request replication of a storage node state machine transitions to a follower node. The leader node may serialize a replication log entry and store the replication log entry into the cache of the leader node. The leader node may then send the replication log entry to one or more follower nodes, where the log entry is deserialized and applied to the local key-value storage.

In some examples, the cache data may indicate one or more access manager nodes of a distributed storage system managed by the leader node. For example, the cache data may include an indication of the one or more access manager nodes used by a leader node to store data. Additionally or alternatively, the cache data may identify one or more storage volumes of the distributed storage system managed by the leader node, one or more storage pools of the distributed storage system managed by the leader node, or any combination thereof. A storage pool may include one or more storage nodes (and/or access manager nodes). In some examples, a storage pool may be an aggregation of storage from across different failure domains. A failure domain may represent an aggregation storage resources under a common top of a rack switch. Additionally or alternatively, storage pools may be used to store data from different tenants. For example, a storage pool may be uniquely identified by a combination of its name and an associated tenant identifier.

In some examples, the server system 125 and the cache replication component 145 may receive, from a leader control plane node at a follower control plane node of a set of control plane nodes of a node cluster, a replication instruction to replicate cache data of the leader control plane node in a cache of the follower control plane node. The server system 125 and the cache replication component 145 may receive, at the follower control plane node, an indication that the follower control plane node is elected to be a new leader control plane node based on failure of the leader control plane node. The server system 125 and the cache replication component 145 may process, by the new leader control plane node, the cache to retrieve an instruction from the leader control plane node to one or more access manager nodes of a distributed storage system. In some cases, the instruction may instruct the one or more access manager nodes managed by the leader control plane node to store data indicated in a request. The server system 125 and the cache replication component 145 may then instruct the one or more access manager nodes of the distributed storage system to store the data in accordance with the instruction retrieved from the cache.

As one example, a decreased availability of control plane node may increase the failover response time by creating several local caches (one for each state machine such for storage node, volumes, and pools) within each node that is updated from leader to follower nodes at a time when there is a state machine transition happening on the leader. Aspects of the present disclosure may use replication techniques and may schedule a background thread to make the various caches coherent across the control plane nodes. Such cache coherency between control planes node and storage nodes during a leader change operation may effectively switch a few bits to enable the cluster manager to start accepting incoming data and metrics traffic. With this change, the system 100 may reactivate cluster management operations almost instantly after a leader failover. For example, when a leader control plane node fails, and another control plane node becomes leader, then the cache on that new leader node helps a cluster manager to achieve fail over within a defined amount of time (e.g., an instant cluster fail over or within a short amount of time).

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
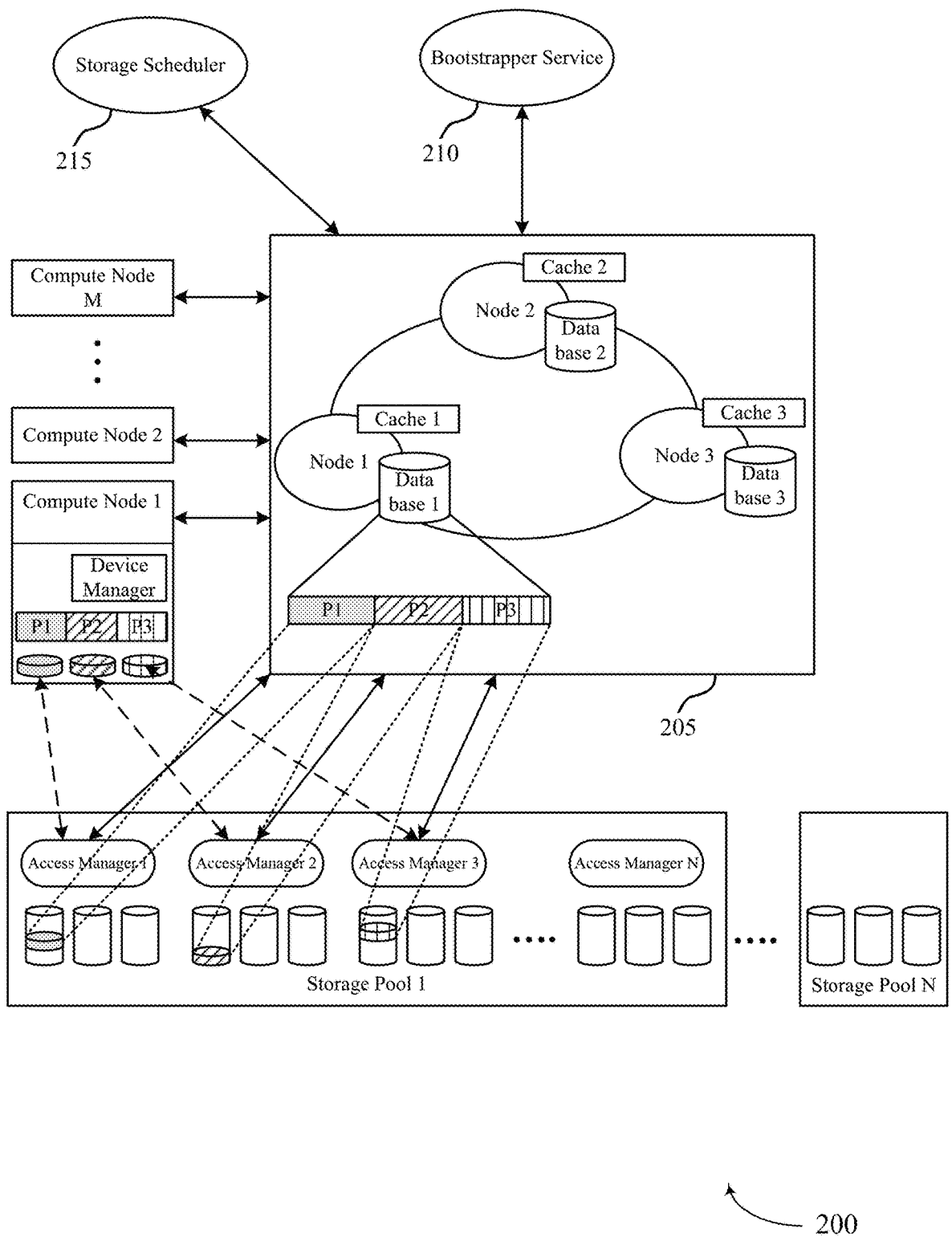
FIG. 2 illustrates an example of a storage architecture that supports techniques to achieve cache coherency across distributed storage clusters in accordance with aspects of the present disclosure.

FIG. 2 illustrates an example of a storage architecture 200 that supports techniques to achieve cache coherency across distributed storage clusters in accordance with aspects of the present disclosure. In the example of FIG. 2, the storage architecture 200 is implemented using a neuron cluster 205. The neuron cluster 205 includes a set of servers (e.g., one or more, and in some instances may include five or seven). Such servers may be known as replicas. Each server may include a storage node, a cache, a database, or any combination thereof. The neuron cluster 205 may provide for a storage architecture, where one or more replicas may continue to operate with quorum even under the failure of at least one of the replicas. If a replica fails, the storage architecture may provide for automatic spawning of a replacement replica. The replacement replica may then be added (as a follower control plane node) to the neuron cluster 205.

In some aspects, the neuron cluster 205 may use a distributed consensus protocol to elect a leader control plane node, and the other control plane nodes of the cluster are referred to as follower control plane nodes. During the bootstrapping of the neuron cluster 205, a workflow engine (bootstrapper service 210) may create the replicas, and each replica may include an ability to boot up as a leader control plane node. In some examples, the workflow engine may randomly choose one of the replicas and designate it as a leader of the neuron cluster. The workflow engine may add the rest of the replicas to the leader control plane node as follower control plane nodes. In the example of FIG. 2, the neuron cluster 205 may include Node 1, Node 2 and Node 3 (although any number of nodes are contemplated). The workflow engine may elect Node 1 as a leader control plane node and Node 2 and Node 3 as follower control plane nodes. Once the neuron cluster 205 is formed, the storage architecture 200 may implement a protocol for management of the cluster operations. The storage architecture 200 may provide for replication of log entries to achieve faster failover in case of a change in the leader node. Each node may have a local key-value store (database 1, database 2, and database 3) which the state machines are persisted. In some examples, a leader control plane node may initiate a state machine replication, and subsequent read operations and write operations may flow from the leader node to follower nodes.

A neuron architecture (e.g., neuron replicated control plane service), as depicted in FIG. 2, may include five components: a cluster manager, a provisioner, a storage pool manager, an API server, and a raft manager. The cluster manager may configure cluster membership management of the storage nodes. The provisioner may manage volume related operations and may perform intelligent data placement. The storage pool manager may categorize the storage nodes based on tenants. The API server may provide an external API interface. The raft manager may implement a consensus protocol for leader election, may provide fault-tolerance by state machine replication of cluster meta-data and may manage a consistent cache across up to all replicas.

As depicted in the example of FIG. 2, the neuron cluster 205 is facilitated by a bootstrapper service 210, also known as a workflow engine. The bootstrapper service 210 may initiate the control plane nodes to form the neuron cluster 205. The bootstrapper service 210 may then initiate one or more storage nodes also known as access manager nodes. The set of control plane nodes (Node 1, Node 2 and Node 3) may coordinate with a set of data plane nodes, referred to herein as access manager nodes, for storing data in underlying hard disks control by a respective access manager node. As depicted in the example of FIG. 2, the bootstrapper service 210 initiates access manager nodes (access managers 1 through N) in storage pool 1. The bootstrapper service 210 may also initiate multiple storage pools (storage pools 1 through N). In some examples, the storage nodes associated with each access manager may register with a cluster manager running on a leader control plane node. In the example where the leader control plane node is Node 1, the storage nodes register with Node 1. The cluster manager residing on Node 1 may assign a unique identifier to each of these nodes and may grant them a lease which the storage nodes renew during a time period (e.g., every few seconds). The storage or access manager nodes may include three main components: a storage engine (also known as Homestore), a control plane component, and a storage target. The storage engine may be a high-performance engine built using extensible b+tree. The control plane component may have a server running to create a volume automatically that includes replica and partitions which are on several different storage nodes. In some examples, a storage engine may be built with a fully asynchronous threading model. The storage engine may run in user-space and may be configured to bypass the kernel, and use stream based allocations—where the storage engine uses different types of block allocation schemes to balance the speed of allocation, write amplification, and fragmentation.

According to aspects depicted in the present disclosure, the leader control plane node (Node 1) may receive a request to store data in a distributed storage system including the set of access manager nodes (access manager 1, access manager 2 and access manager 3). For example, the leader control plane node may receive a request from one or more compute nodes (compute nodes 1 through M) requesting storage of data. The leader control plane node (Node 1) may generate cache data identifying an instruction from the leader control plane node to one or more access manager nodes managed by the leader control plane node of the set of access manager nodes. Node 1 may generate cache data including the instruction and may store the cache data in Cache 1. A cache, as described herein, may refer to a memory or other computer storage device capable of storing instructions, data, information, or the like. In some examples, the instruction may instruct the one or more access manager nodes to store the data indicated in the request. For instance, Node 1 may receive a request to store data portions P1, P2 and P3. The instructions may instruct the access manager 1 to store data portion P1, the access manager 2 to store data portion P2, and the access manager 3 to store data portion P3. The leader control plane node (Node 1) may then transmit a replication instruction to one or more follower control plane nodes to replicate the cache data in a respective cache of the one or more follower control plane nodes. In the example of FIG. 2, Node 1 may instruct Node 2 and Node 3 to replicate the cache data of Node 1 in a respective cache of Node 2 and Node 3. Upon receiving the indication of replication, Cache 2 of Node 2 and Cache 3 of Node 3 may include the instruction instructing the access manager nodes (access manager 1, access manager 2, and access manager 3) to store the data indicated in the request to Node 1. By replicating the instructions across multiple caches, the techniques depicted herein provide for maintaining cache coherency across a set of control plane nodes to quickly establish a new leader node when a leader node fails, thus resulting in reduced latency.

As depicted herein, the storage architecture 200 may represent a central repository of a storage service. The storage architecture 200 may maintain a storage cluster metadata and may replicate the metadata across several nodes. The number of replicas may depend on the amount of fault tolerance desired in each deployed environment.

Figure 3:
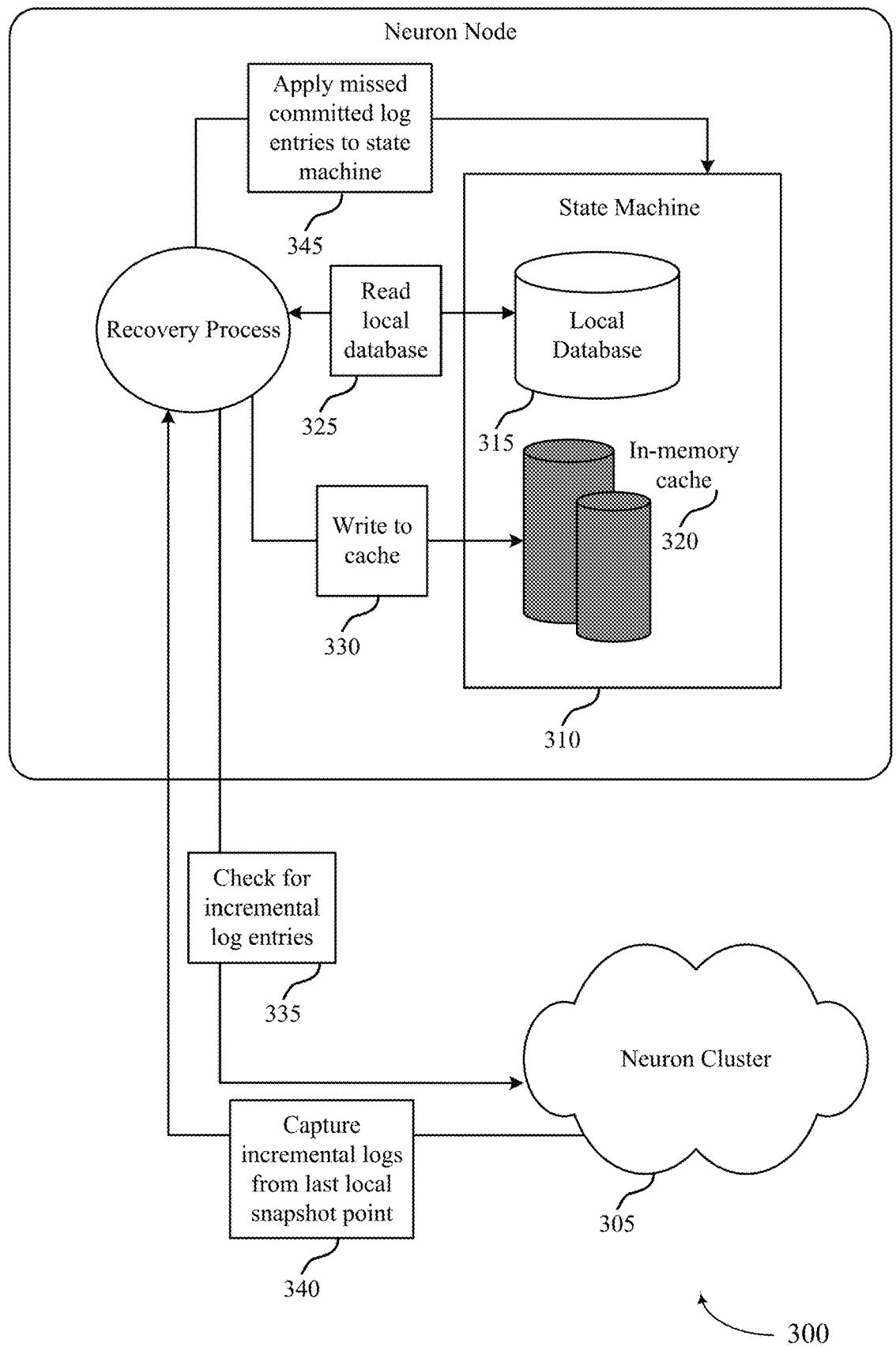
FIG. 3 illustrates an example of a recovery architecture that supports techniques to achieve cache coherency across distributed storage clusters in accordance with aspects of the present disclosure.

FIG. 3 illustrates an example of a recovery architecture 300 that supports techniques to achieve cache coherency across distributed storage clusters in accordance with aspects of the present disclosure. The recovery architecture 300 may be implemented using a neuron cluster 305, and a state machine 310. The state machine 310 may include a local database 315 and an in-memory cache 320. As described with reference to FIGS. 1 and 2, the neuron cluster 305 maintains a distributed storage system including a set of control plane nodes. The neuron cluster 305 may designate a control plane node as a leader control plane node and other control plane nodes as follower control plane nodes. For instance, during bootstrapping, an administrator may choose a leader and add followers to the existing leader. The follower control plane nodes may each maintain a copy of cache data of the leader control plane node. If there is a change in leader, the new leader may broadcast information indicating the change to one or more registered storage nodes so that subsequent requests can be sent to the new leader. In some examples, techniques depicted herein may use a state machine replication technique to maintain consistency between different control plane nodes. Each committed operation in a log may be considered as an action to the state machine.

For the recovery architecture 300, at 325, the recovery process may read the local database 315. At 330, the recovery process may write the contents to an in-memory cache 320. At 335, the recovery process may check for incremental log entries from the neuron cluster 305. Based on checking for incremental log entries, at 340, the recovery process may capture the incremental logs from a last local snapshot point. At 345, the recovery process may apply one or more missed committed log entries to the state machine 310. Thus, the recovery architecture 300 may manage an in-memory cache 320 with a replacement policy to store both access manager nodes and volume related information (e.g., metadata) associated with up to each log entry to, for example, a newly elected leader to complete one or more unfinished tasks corresponding to a log entry that a prior leader did not complete due to, for example, failure of the prior leader. For a successful commit to the state machine 310, the update is reflected in the in-memory cache 320 in addition to the local database 315.

In some examples, the metadata size may be small enough to keep the metadata in-memory without a replacement policy. If one or more of the control plane nodes are rebooted in the neuron cluster 305, it may first read the tables at the local database 315 (at 325) and may then load the metadata information in the in-memory cache 320. The neuron cluster 305 may then participate in communications (e.g., APIs, consensus, etc.). After that, the neuron cluster 305 may implement a protocol to check a commit sequence number with other replicas. The neuron cluster 305 may then synchronize with one or more other replicas by applying the uncommitted log entries to the state machine 310 (i.e., both local database 315 and in-memory cache 320).

Figure 4:
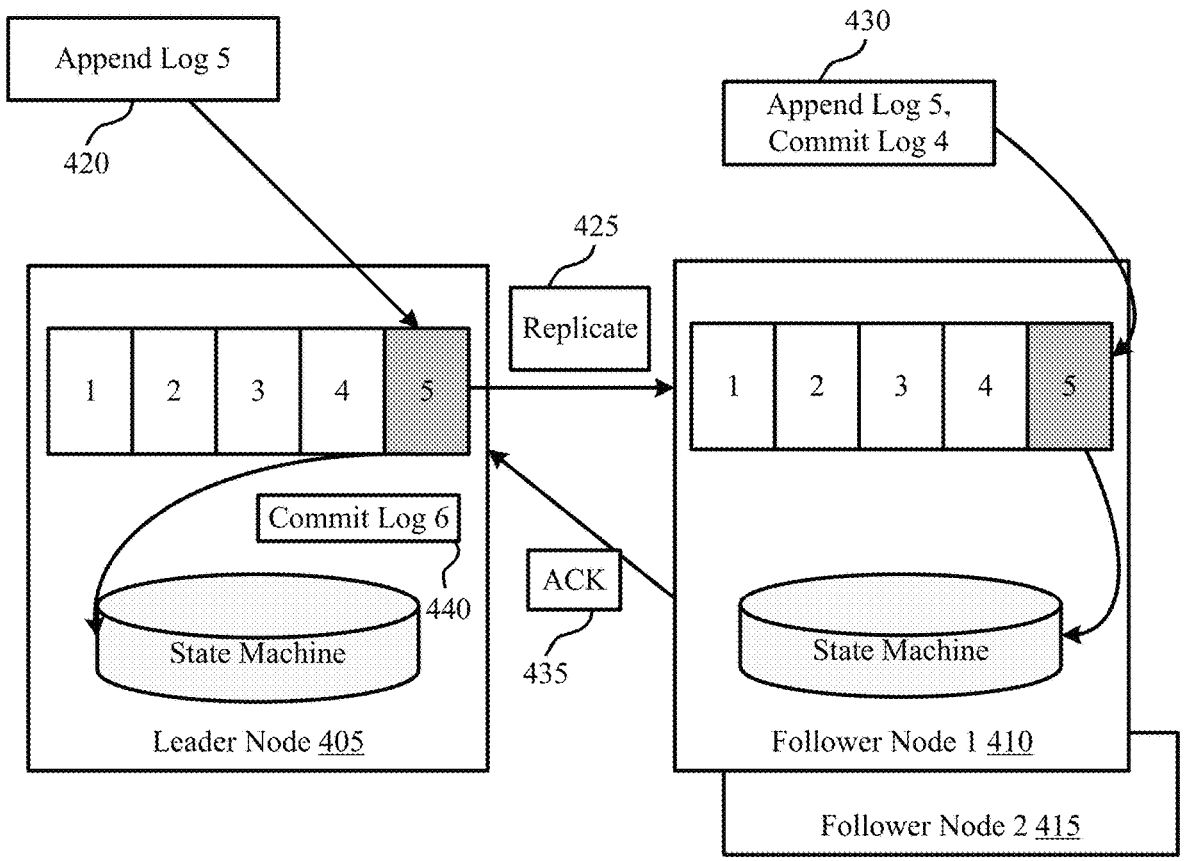
FIG. 4 illustrates an example of a distributed consensus protocol that supports techniques to achieve cache coherency across distributed storage clusters in accordance with aspects of the present disclosure.

FIG. 4 illustrates an example of a distributed consensus protocol 400 that supports techniques to achieve cache coherency across distributed storage clusters in accordance with aspects of the present disclosure. According to the distributed consensus protocol 400, a neuron cluster may select a control plane node as a leader node and may select one or more control plane nodes (distinct from the leader node) as follower control plane nodes. The distributed consensus protocol 400 may adopt a policy such that there is one leader at a time. A leader node may accept incoming write requests and may then replicate the write requests to the follower nodes. An incoming write request may correspond to a single log entry, which is stored in a separate log section. A log entry may be associated with a unique index number (e.g., a log number) in a monotonically increasing order.

As depicted in the example of FIG. 4, the neuron cluster may select a leader node 405, a first follower node 410 and a second follower node 415. The leader node 405 may receive a write request. Once the leader node receives the write request, at 420, the leader node 405 may append a log entry to its log section. For example, the leader node 405 may append log 5. At 425, the leader node 405 may replicate the request to the follower nodes (e.g., first follower node 410 and second follower node 415). Each follower node may receive the replication request from the leader node 405. In the example of FIG. 4, the first follower node 410 and the second follower node 415 may receive the log entry (log 5). At 430, each follower node may append the log to its log section. For example, the first follower node 410 and the second follower node 415 may append log 5 and commit log 4. At 435, the follower nodes may return a response (e.g., acknowledgment) back to the leader node 405. The distributed consensus protocol 400 may use a write policy where the leader node 405 commit the log entry and apply the log entry to the state machine once the leader node 405 gets responses from a majority of follower nodes including itself. At 440, the leader node 405 may commit log 6.

After commit, the leader node 405 may replicate the committed log number to the follower nodes, and the follower nodes may then commit the log corresponding to the given log number and apply it to their state machines. In some examples, a log replication request may include the committed log number of previous log replication, such that they are always pipelined. The leader node 405 may periodically send one or more updates to the follower nodes (e.g., follower node 410 and follower node 415). In some examples, each follower node may maintain a randomized timer whose lower bound may be larger than the update interval. When a follower node receives the update, the follower node may reset its timer with a new random expiry. If the timer is expired due to no update within a threshold time period, the follower node may determine that the leader node has failed and may request a vote on the election of the next leader to up to all the other follower nodes. Once a majority of nodes vote for the node who initiated the election, the node becomes a leader and starts to serve write requests. In some examples, the node who initiated the election may become a leader based on a threshold number of nodes voting for the node. In other examples, a node may be elected leader based on the node having sufficient or the most processing bandwidth of the nodes, the node having sufficient processing capability to perform leader operations, the node being able to meet at least one latency criterion in performing leader operations, or the like.

In some examples, a conflict may occur during an absence of a leader node or a network disconnection. To resolve the conflict, techniques depicted herein may provide for a counter called term, which is increased when a new leader election is initiated. In some examples, up to follower nodes are configured to have the same term value as that of a current leader. Each replication request or update (from the leader node) may include the term value of a current leader node. Additionally or alternatively, up to each log entry may keep the term value of the time when the log entry was generated. If the current leader receives a message with higher term from a follower node, the message with the higher term may mean that a new leader has been elected by a majority of nodes. In such cases, the leader node may immediately give up the leader role and may become a follower. Conflict may happen when the leader node succeeds to append a new log entry to its log section, but fails to replicate the new log entry to followers due to various reasons such as server crash or network isolation. In such cases, a new leader is elected and the new leader may serve new logs. If the previous leader is recovered from the fault and re-joins as a follower, the previous leader and the current leader may see different log entries whose log number is the same. In such a case, the previous leader may find the last log entry whose term is the same as that of corresponding log entry in the current leader. Then, the previous leader may initiate overwriting log entries starting from that point using the current leader's log entries.

Figure 5:
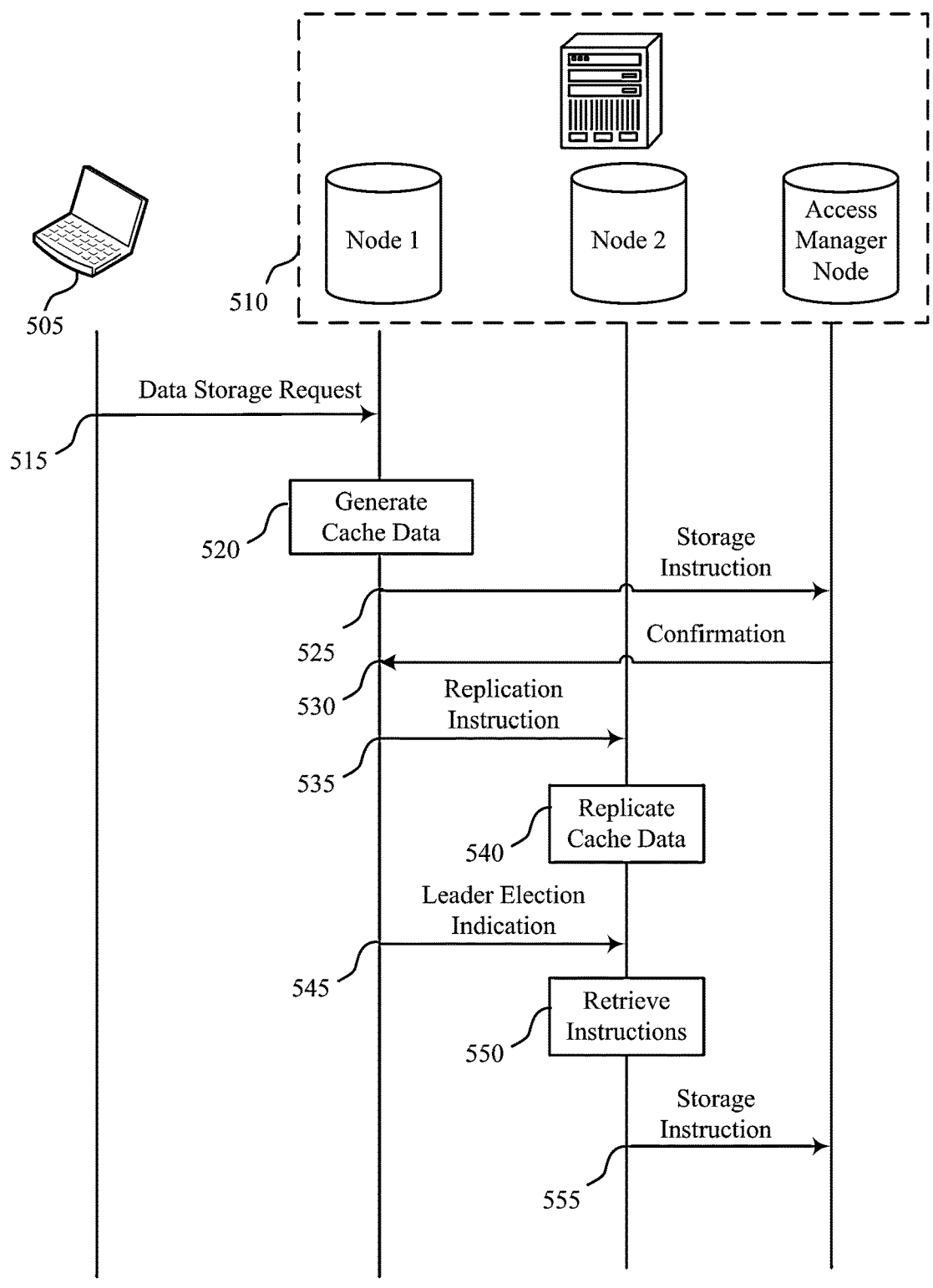
FIG. 5 illustrates an example of a process flow that supports techniques to achieve cache coherency across distributed storage clusters in accordance with aspects of the present disclosure.

FIG. 5 illustrates an example of a process flow 500 that supports techniques to achieve cache coherency across distributed storage clusters in accordance with aspects of the present disclosure. Process flow 500 may include a user device 505 and a server system 510. The server system 510 may be an example of server system 125 as described with reference to FIG. 1. The user device 505 may be example of a user device 110 as described with reference to FIG. 1. The server system 510 may receive data for storage from the user device 505. The server 510 may include a leader control plane node (Node 1), a follower control plane node (Node 2) and an access manager node. Although a single follower node is shown, it is to be understood that the process flow 500 may support multiple follower nodes. Additionally or alternatively, although a single access manager node is shown, it is to be understood that the process flow 500 may support multiple access manager nodes.

The server may represent a set of computing components, data storage components, and the like, as described herein. In some examples, the operations illustrated in the process flow 500 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 515, the leader control plane node (Node 1) may receive a request to store data in a distributed storage system including a set of access manager nodes. As depicted herein, the leader control plane node may manage one or more access manager nodes. At 520, the leader control plane node may generate cache data identifying an instruction from the leader control plane node to one or more access manager nodes managed by the leader control plane node. In some examples, the instruction may instruct the one or more access manager nodes to store the data indicated in the request. In some examples, the leader control plane node may create, in the cache of the leader control plane node, a replication log entry including the instruction for storing the data indicated in the request by the one or more access manager nodes of the distributed storage system.

At 525, the leader control plane node may transmit the instruction to the access manager node. The leader control plane node may instruct the one or more access manager nodes to store the data in the distributed storage system in accordance with the instruction. At 530, the leader control plane node may receive, from the one or more access manager nodes, a confirmation message indicating that the data indicated in the request has been stored data by the one or more access manager nodes. In some examples, the leader control plane node may update the replication log entry of the cache to indicate that the data indicated in the request has been stored data by the one or more access manager nodes of the distributed storage system, or otherwise indicating that the access manager has completed the requested instruction.

At 535, the leader control plane node may transmit a replication instruction to one or more follower control plane nodes to replicate the cache data in a respective cache of the one or more follower control plane nodes. The follower control plane node (Node 2) may receive, from the leader control plane node, the replication instruction to replicate cache data of the leader control plane node in a cache of the follower control plane node. At 540, the follower control plane node may replicate the cache data.

At 545, the follower control plane node may receive an indication that the follower control plane node is elected to be a new leader control plane node based on failure of the leader control plane node. In some cases, the follower control plane node may receive the election indication from elsewhere in the neuron cluster if, for example, the prior leader control plane node failed. At 550, the follower control plane node may process its replicated cache to retrieve an instruction from the leader control plane node to one or more access manager nodes of a distributed storage system. In some examples, the instruction may instruct the one or more access manager nodes managed by the leader control plane node to store data indicated in a request. In some examples, the follower control plane node may identify a replication log entry associated with the prior leader node. The follower control plane node may identify incomplete log entries from the replication log entry associated with the prior leader node (e.g., due to failure of the prior leader node). For example, the follower control plane node may identify that at least one instruction has not been executed by the access manager nodes. At 555, the follower control plane node may instruct the one or more access manager nodes of the distributed storage system to store the data in accordance with the instruction retrieved from the cache. For example, the follower control plane node may instruct the access manager nodes to complete an incomplete tasks at the prior leader node.

Figure 6:
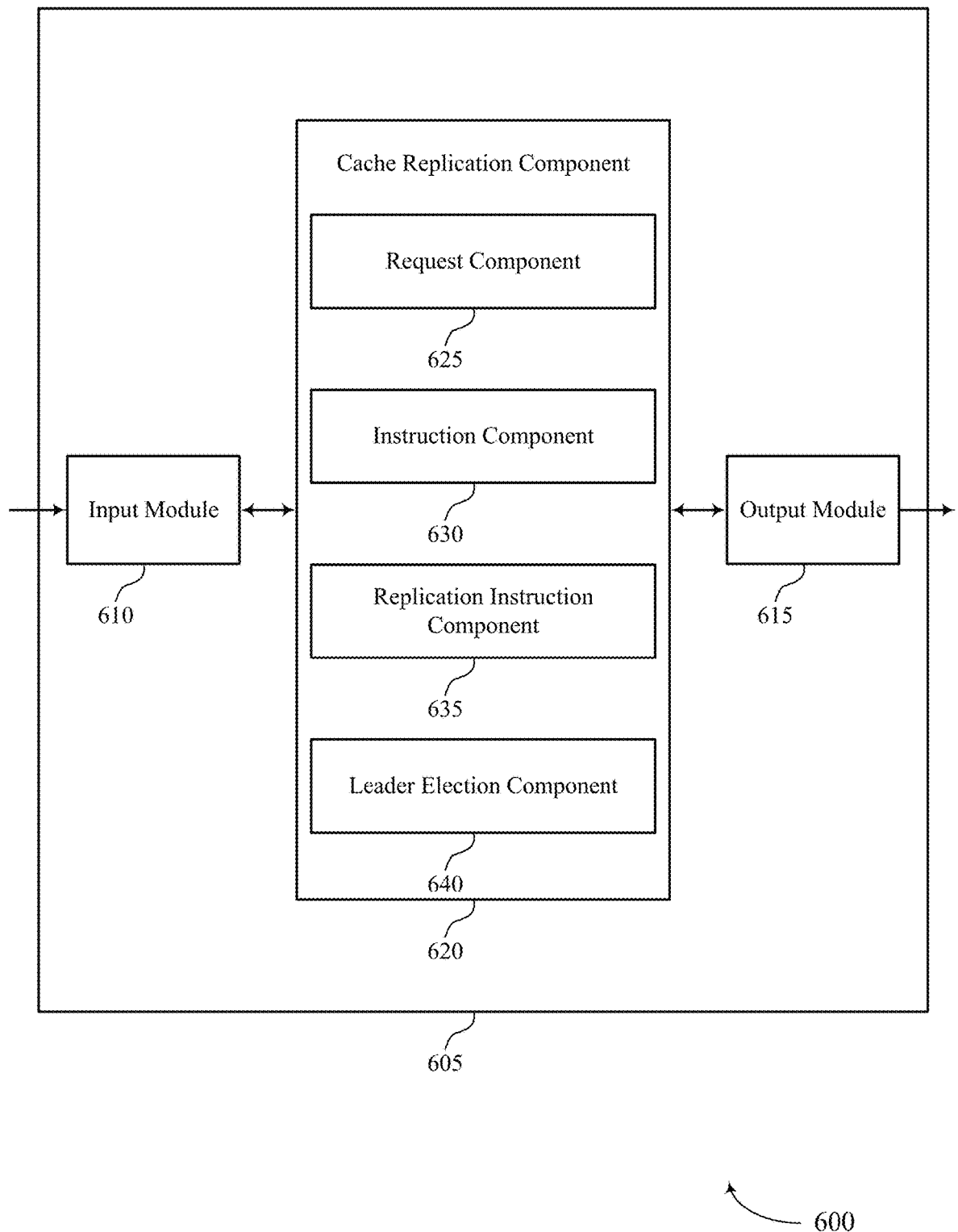
FIG. 6 shows a block diagram of an apparatus that supports techniques to achieve cache coherency across distributed storage clusters in accordance with aspects of the present disclosure.

FIG. 6 shows a block diagram 600 of a device 605 that supports techniques to achieve cache coherency across distributed storage clusters in accordance with aspects of the present disclosure. The device 605 may include an input module 610, an output module 615, and a cache replication component 620. The device 605 may also include a processor. Each of these components may be in communication with one another (e.g., via one or more buses).

The input module 610 may manage input signals for the device 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the device 605 for processing. For example, the input module 610 may transmit input signals to the cache replication component 620 to support techniques to achieve cache coherency across distributed storage clusters. In some cases, the input module 610 may be a component of an I/O controller 810 as described with reference to FIG. 8.

The output module 615 may manage output signals for the device 605. For example, the output module 615 may receive signals from other components of the device 605, such as the cache replication component 620, and may transmit these signals to other components or devices. In some examples, the output module 615 may transmit output signals for display in a user interface, for storage in a database or data store, for further processing at a server or server cluster, or for any other processes at any number of devices or systems. In some cases, the output module 615 may be a component of an I/O controller 810 as described with reference to FIG. 8.

For example, the cache replication component 620 may include a request component 625, an instruction component 630, a replication instruction component 635, a leader election component 640, or any combination thereof. In some examples, the cache replication component 620, or various components thereof, may be configured to perform various operations (e.g., receiving, monitoring, transmitting) using or otherwise in cooperation with the input module 610, the output module 615, or both. For example, the cache replication component 620 may receive information from the input module 610, send information to the output module 615, or be integrated in combination with the input module 610, the output module 615, or both to receive information, transmit information, or perform various other operations as described herein.

The cache replication component 620 may support data storage in accordance with examples as disclosed herein. The request component 625 may be configured as or otherwise support a means for receiving, at a leader control plane node of a plurality of control plane nodes of a node cluster, a request to store data in a distributed storage system comprising a plurality of access manager nodes. The instruction component 630 may be configured as or otherwise support a means for generating, by the leader control plane node, cache data identifying an instruction from the leader control plane node to one or more access manager nodes managed by the leader control plane node of the plurality of access manager nodes, the instruction instructing the one or more access manager nodes to store the data indicated in the request. The replication instruction component 635 may be configured as or otherwise support a means for transmitting, by the leader control plane node, a replication instruction to one or more follower control plane nodes of the plurality of control plane nodes to replicate the cache data in a respective cache of the one or more follower control plane nodes.

Additionally or alternatively, the cache replication component 620 may support data storage in accordance with examples as disclosed herein. The replication instruction component 635 may be configured as or otherwise support a means for receiving, from a leader control plane node at a follower control plane node of a plurality of control plane nodes of a node cluster, a replication instruction to replicate cache data of the leader control plane node in a cache of the follower control plane node. The leader election component 640 may be configured as or otherwise support a means for receiving, at the follower control plane node, an indication that the follower control plane node is elected to be a new leader control plane node based at least in part on failure of the leader control plane node. The instruction component 630 may be configured as or otherwise support a means for processing, by the new leader control plane node, the cache to retrieve an instruction from the leader control plane node to one or more access manager nodes of a distributed storage system, the instruction instructing the one or more access manager nodes managed by the leader control plane node to store data indicated in a request. The instruction component 630 may be configured as or otherwise support a means for instructing the one or more access manager nodes of the distributed storage system to store the data in accordance with the instruction retrieved from the cache.

Figure 7:
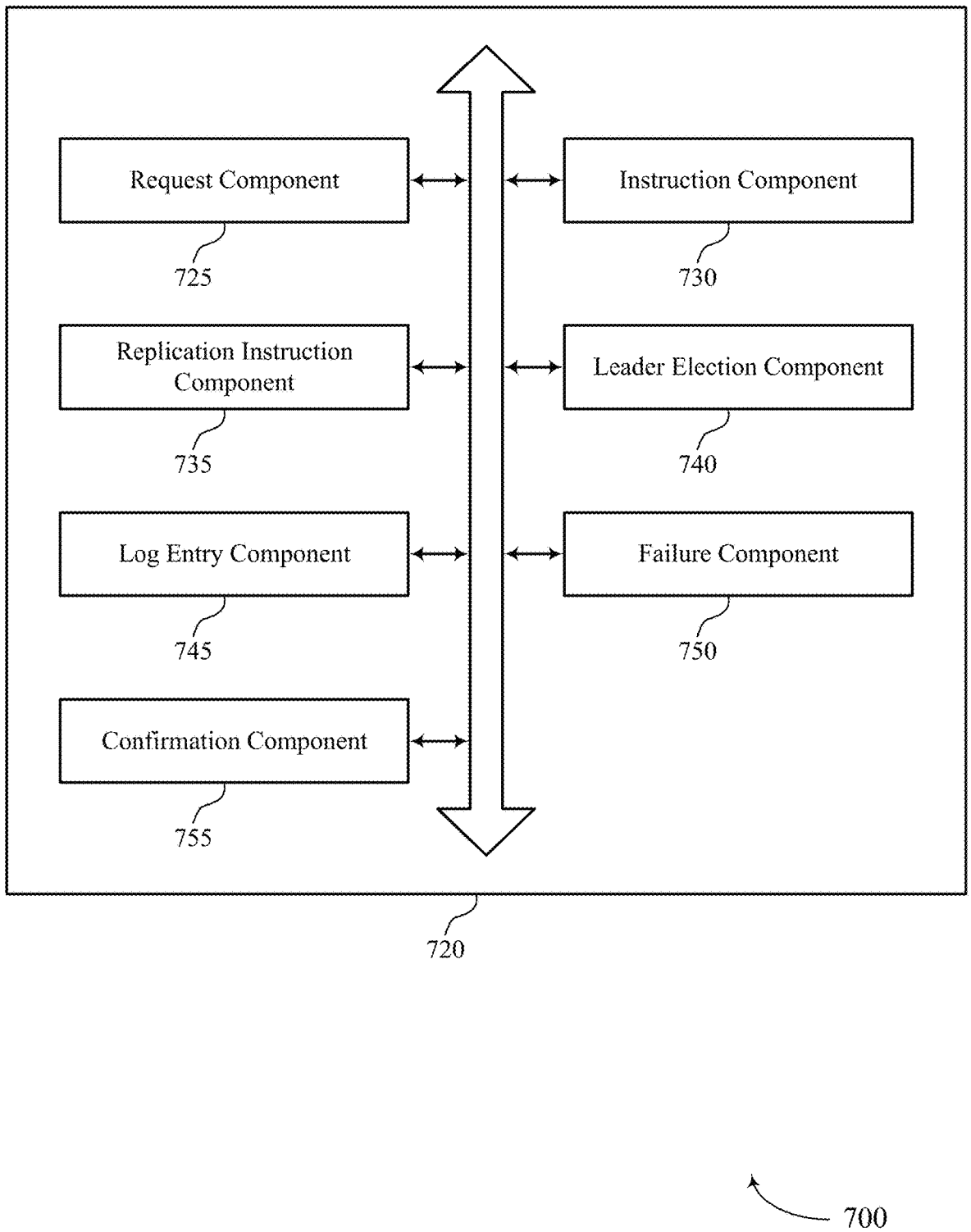
FIG. 7 shows a block diagram of a cache replication component that supports techniques to achieve cache coherency across distributed storage clusters in accordance with aspects of the present disclosure.

FIG. 7 shows a block diagram 700 of a cache replication component 720 that supports techniques to achieve cache coherency across distributed storage clusters in accordance with aspects of the present disclosure. The cache replication component 720 may be an example of aspects of a cache replication component or a cache replication component 620, or both, as described herein. The cache replication component 720, or various components thereof, may be an example of means for performing various aspects of techniques to achieve cache coherency across distributed storage clusters as described herein. For example, the cache replication component 720 may include a request component 725, an instruction component 730, a replication instruction component 735, a leader election component 740, a log entry component 745, a failure component 750, a confirmation component 755, or any combination thereof. Each of these components may communicate, directly or indirectly, with one another (e.g., via one or more buses).

The cache replication component 720 may support data storage in accordance with examples as disclosed herein. The request component 725 may be configured as or otherwise support a means for receiving, at a leader control plane node of a plurality of control plane nodes of a node cluster, a request to store data in a distributed storage system comprising a plurality of access manager nodes. The instruction component 730 may be configured as or otherwise support a means for generating, by the leader control plane node, cache data identifying an instruction from the leader control plane node to one or more access manager nodes managed by the leader control plane node of the plurality of access manager nodes, the instruction instructing the one or more access manager nodes to store the data indicated in the request. The replication instruction component 735 may be configured as or otherwise support a means for transmitting, by the leader control plane node, a replication instruction to one or more follower control plane nodes of the plurality of control plane nodes to replicate the cache data in a respective cache of the one or more follower control plane nodes.

In some examples, the instruction component 730 may be configured as or otherwise support a means for instructing the one or more access manager nodes to store the data in the distributed storage system in accordance with the instruction. In some examples, to support generating the cache data, the log entry component 745 may be configured as or otherwise support a means for creating, in the cache of the leader control plane node, a replication log entry comprising the instruction for storing the data indicated in the request by the one or more access manager nodes of the distributed storage system.

In some examples, the confirmation component 755 may be configured as or otherwise support a means for receiving, from the one or more access manager nodes, a confirmation message indicating that the data indicated in the request has been stored data by the one or more access manager nodes. In some examples, the log entry component 745 may be configured as or otherwise support a means for updating the replication log entry of the cache to indicate that the data indicated in the request has been stored data by the one or more access manager nodes of the distributed storage system.

In some examples, the failure component 750 may be configured as or otherwise support a means for determining a failure of the leader control plane node. In some examples, the leader election component 740 may be configured as or otherwise support a means for transmitting, to a follower control plane node of the one or more follower control plane nodes, an indication that the follower control plane node is elected to be a new leader control plane node based at least in part on failure of the leader control plane node.

In some examples, the cache data indicates one or more access manager nodes of the distributed storage system managed by the leader control plane node, or one or more storage volumes of the distributed storage system managed by the leader control plane node, or one or more storage pools of the distributed storage system managed by the leader control plane node, or any combination thereof. In some examples, the request to store data in the distributed storage system comprises a write request.

Additionally or alternatively, the cache replication component 720 may support data storage in accordance with examples as disclosed herein. In some examples, the replication instruction component 735 may be configured as or otherwise support a means for receiving, from a leader control plane node at a follower control plane node of a plurality of control plane nodes of a node cluster, a replication instruction to replicate cache data of the leader control plane node in a cache of the follower control plane node. The leader election component 740 may be configured as or otherwise support a means for receiving, at the follower control plane node, an indication that the follower control plane node is elected to be a new leader control plane node based at least in part on failure of the leader control plane node. In some examples, the instruction component 730 may be configured as or otherwise support a means for processing, by the new leader control plane node, the cache to retrieve an instruction from the leader control plane node to one or more access manager nodes of a distributed storage system, the instruction instructing the one or more access manager nodes managed by the leader control plane node to store data indicated in a request. In some examples, the instruction component 730 may be configured as or otherwise support a means for instructing the one or more access manager nodes of the distributed storage system to store the data in accordance with the instruction retrieved from the cache.

In some examples, the log entry component 745 may be configured as or otherwise support a means for processing the cache to identify a replication log entry comprising the instruction for storing the data indicated in the request via the one or more access manager nodes of the distributed storage system. In some examples, the instruction component 730 may be configured as or otherwise support a means for instructing the one or more access manager nodes of the distributed storage system to store the data indicated in the request based at least in part on the replication log entry.

In some examples, the confirmation component 755 may be configured as or otherwise support a means for receiving, from the one or more access manager nodes, a confirmation message indicating that the data indicated in the request has been stored data by the one or more access manager nodes.

In some examples, the request component 725 may be configured as or otherwise support a means for receiving, at the new leader control plane node, a second request to store data in the one or more access manager nodes. In some examples, the instruction component 730 may be configured as or otherwise support a means for generating, by the new leader control plane node, a second cache data identifying a second instruction from the new leader control plane node to the one or more access manager nodes, the second instruction instructing the one or more access manager nodes to store the data indicated in the second request. In some examples, the instruction component 730 may be configured as or otherwise support a means for transmitting, by the new leader control plane node, a second replication instruction to one or more follower control plane nodes of the new leader control plane node to replicate the second cache data in a respective cache of the one or more follower control plane nodes.

In some examples, the instruction component 730 may be configured as or otherwise support a means for instructing the one or more access manager nodes to store the data in the distributed storage system in accordance with the second instruction. In some examples, the cache data indicates one or more access manager nodes of the distributed storage system managed by the leader control plane node, or one or more storage volumes of the distributed storage system managed by the leader control plane node, or one or more storage pools of the distributed storage system managed by the leader control plane node, or any combination thereof. In some examples, a second cache of the new leader control plane node may be configured to achieve cluster fail over within a defined amount of time.

Figure 8:
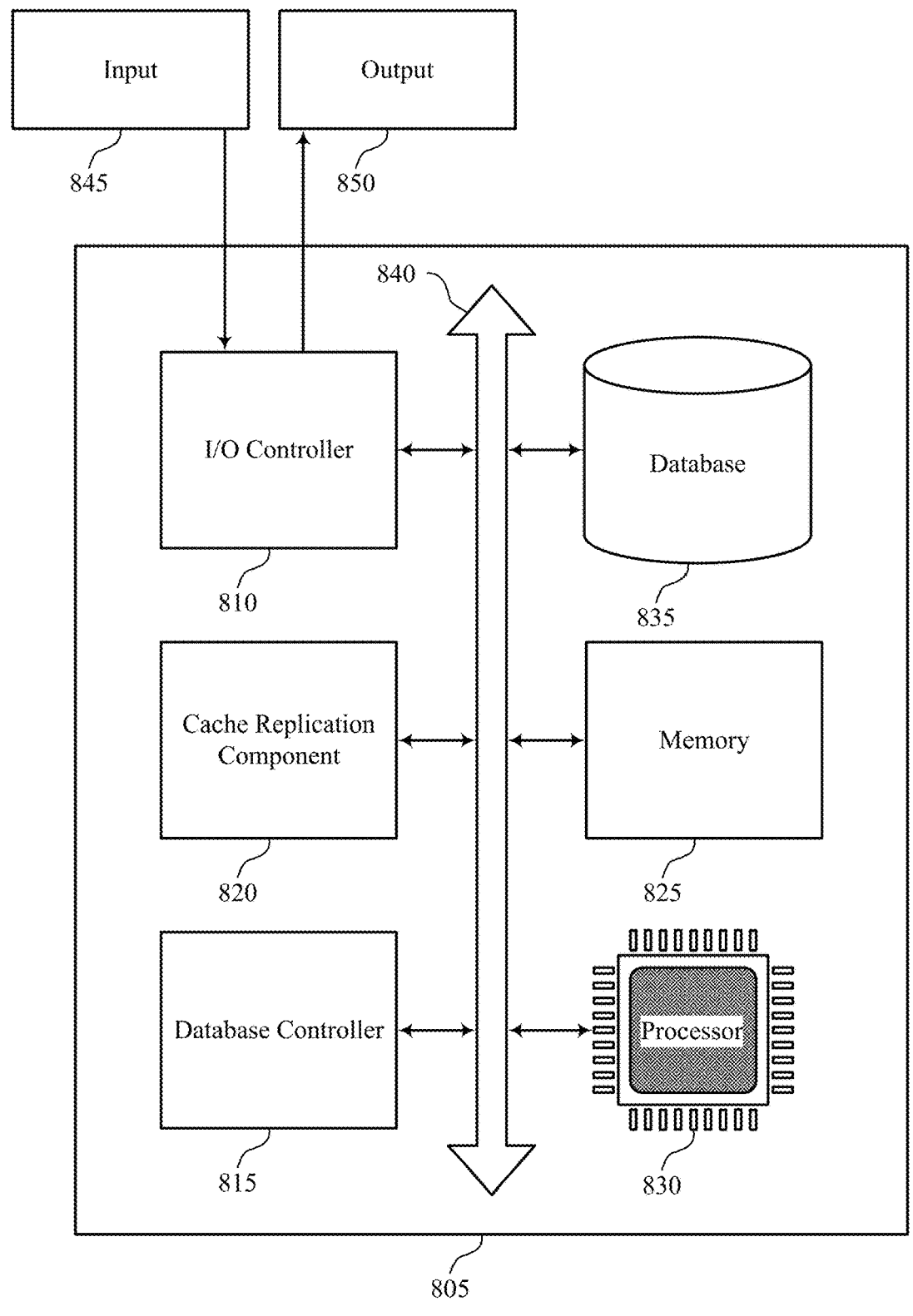
FIG. 8 shows a diagram of a system including a device that supports techniques to achieve cache coherency across distributed storage clusters in accordance with aspects of the present disclosure.

FIG. 8 shows a diagram of a system 800 including a device 805 that supports techniques to achieve cache coherency across distributed storage clusters in accordance with aspects of the present disclosure. The device 805 may be an example of or include the components of a device 605 as described herein. The device 805 may include components for bi-directional data communications including components for transmitting and receiving communications, such as a cache replication component 820, an I/O controller 810, a database controller 815, a memory 825, a processor 830, and a database 835. These components may be in electronic communication or otherwise coupled (e.g., operatively, communicatively, functionally, electronically, electrically) via one or more buses (e.g., a bus 840).

The I/O controller 810 may manage input signals 845 and output signals 850 for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. In other cases, the I/O controller 810 may represent or interact with a modem, a keyboard, a mouse, a touchscreen, or a similar device. In some cases, the I/O controller 810 may be implemented as part of a processor 830. In some examples, a user may interact with the device 805 via the I/O controller 810 or via hardware components controlled by the I/O controller 810.

The database controller 815 may manage data storage and processing in a database 835. In some cases, a user may interact with the database controller 815. In other cases, the database controller 815 may operate automatically without user interaction. The database 835 may be an example of a single database, a distributed database, multiple distributed databases, a data store, a data lake, or an emergency backup database.

Memory 825 may include random-access memory (RAM) and ROM. The memory 825 may store computer-readable, computer-executable software including instructions that, when executed, cause the processor 830 to perform various functions described herein. In some cases, the memory 825 may contain, among other things, a BIOS which may control basic hardware or software operation such as the interaction with peripheral components or devices.

The processor 830 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting techniques to achieve cache coherency across distributed storage clusters).

The cache replication component 820 may support data storage in accordance with examples as disclosed herein. For example, the cache replication component 820 may be configured as or otherwise support a means for receiving, at a leader control plane node of a plurality of control plane nodes of a node cluster, a request to store data in a distributed storage system comprising a plurality of access manager nodes. The cache replication component 820 may be configured as or otherwise support a means for generating, by the leader control plane node, cache data identifying an instruction from the leader control plane node to one or more access manager nodes managed by the leader control plane node of the plurality of access manager nodes, the instruction instructing the one or more access manager nodes to store the data indicated in the request. The cache replication component 820 may be configured as or otherwise support a means for transmitting, by the leader control plane node, a replication instruction to one or more follower control plane nodes of the plurality of control plane nodes to replicate the cache data in a respective cache of the one or more follower control plane nodes.

Additionally or alternatively, the cache replication component 820 may support data storage in accordance with examples as disclosed herein. For example, the cache replication component 820 may be configured as or otherwise support a means for receiving, from a leader control plane node at a follower control plane node of a plurality of control plane nodes of a node cluster, a replication instruction to replicate cache data of the leader control plane node in a cache of the follower control plane node. The cache replication component 820 may be configured as or otherwise support a means for receiving, at the follower control plane node, an indication that the follower control plane node is elected to be a new leader control plane node based at least in part on failure of the leader control plane node. The cache replication component 820 may be configured as or otherwise support a means for processing, by the new leader control plane node, the cache to retrieve an instruction from the leader control plane node to one or more access manager nodes of a distributed storage system, the instruction instructing the one or more access manager nodes managed by the leader control plane node to store data indicated in a request. The cache replication component 820 may be configured as or otherwise support a means for instructing the one or more access manager nodes of the distributed storage system to store the data in accordance with the instruction retrieved from the cache.

By including or configuring the cache replication component 820 in accordance with examples as described herein, the device 805 may support techniques for improved data storage functionality, reduced latency, improved user experience related to efficient data processing, and more efficient utilization of storage resources.

Figure 9:
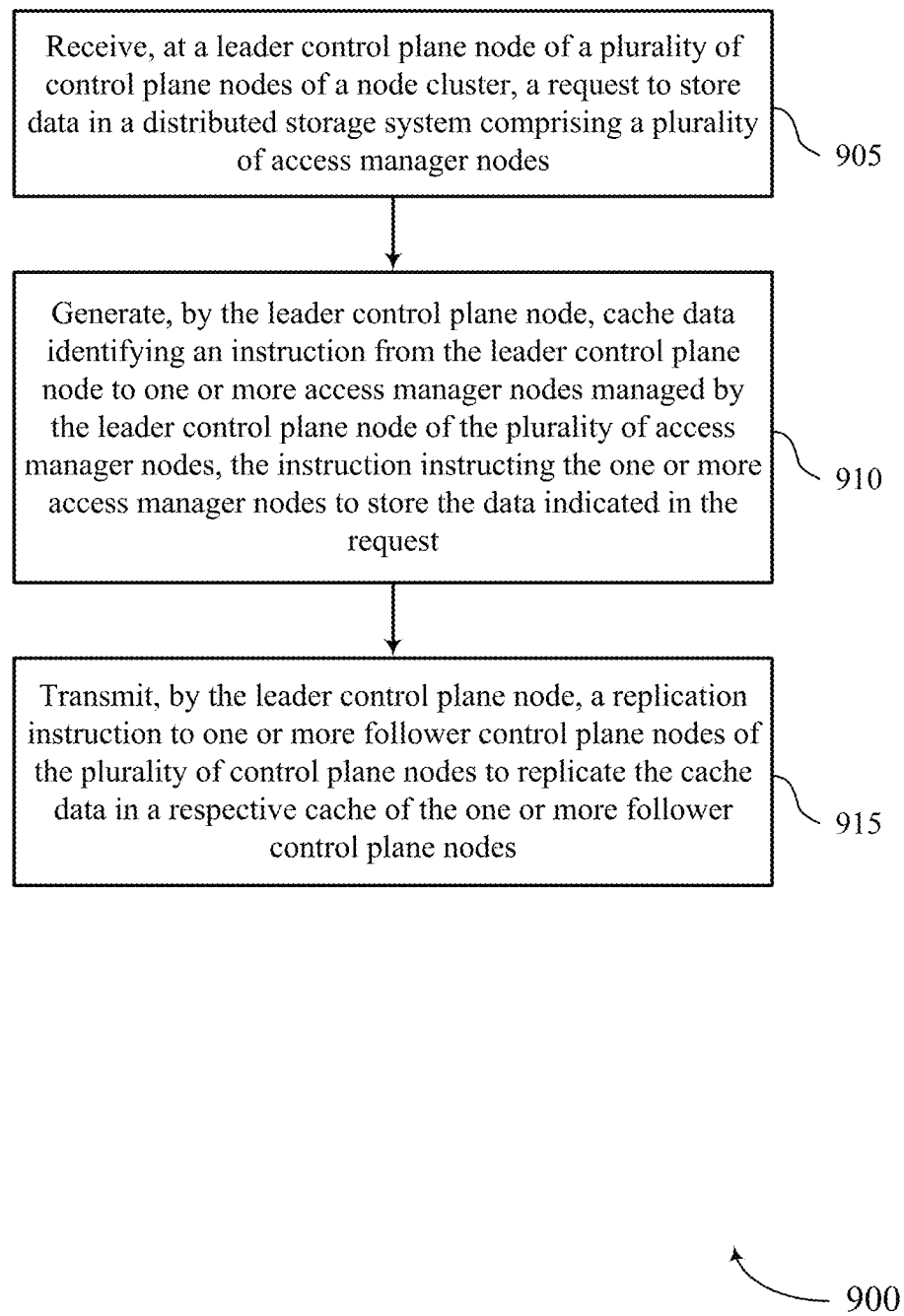
FIGS. 9 through 12 show flowcharts illustrating methods that support techniques to achieve cache coherency across distributed storage clusters in accordance with aspects of the present disclosure.

FIG. 9 shows a flowchart illustrating a method 900 that supports techniques to achieve cache coherency across distributed storage clusters in accordance with aspects of the present disclosure. The operations of the method 900 may be implemented by a storage architecture or its components as described herein. For example, the operations of the method 900 may be performed by a storage architecture as described with reference to FIGS. 1 through 8. In some examples, a storage architecture may execute a set of instructions to control the functional elements of the storage architecture to perform the described functions. Additionally or alternatively, the storage architecture may perform aspects of the described functions using special-purpose hardware.

At 905, the method may include receiving, at a leader control plane node of a plurality of control plane nodes of a node cluster, a request to store data in a distributed storage system comprising a plurality of access manager nodes. The operations of 905 may be performed in accordance with examples as disclosed herein. In some examples, aspects of the operations of 905 may be performed by a request component 725 as described with reference to FIG. 7.

At 910, the method may include generating, by the leader control plane node, cache data identifying an instruction from the leader control plane node to one or more access manager nodes managed by the leader control plane node of the plurality of access manager nodes, the instruction instructing the one or more access manager nodes to store the data indicated in the request. The operations of 910 may be performed in accordance with examples as disclosed herein. In some examples, aspects of the operations of 910 may be performed by an instruction component 730 as described with reference to FIG. 7.

At 915, the method may include transmitting, by the leader control plane node, a replication instruction to one or more follower control plane nodes of the plurality of control plane nodes to replicate the cache data in a respective cache of the one or more follower control plane nodes. The operations of 915 may be performed in accordance with examples as disclosed herein. In some examples, aspects of the operations of 915 may be performed by a replication instruction component 735 as described with reference to FIG. 7.

Figure 10:
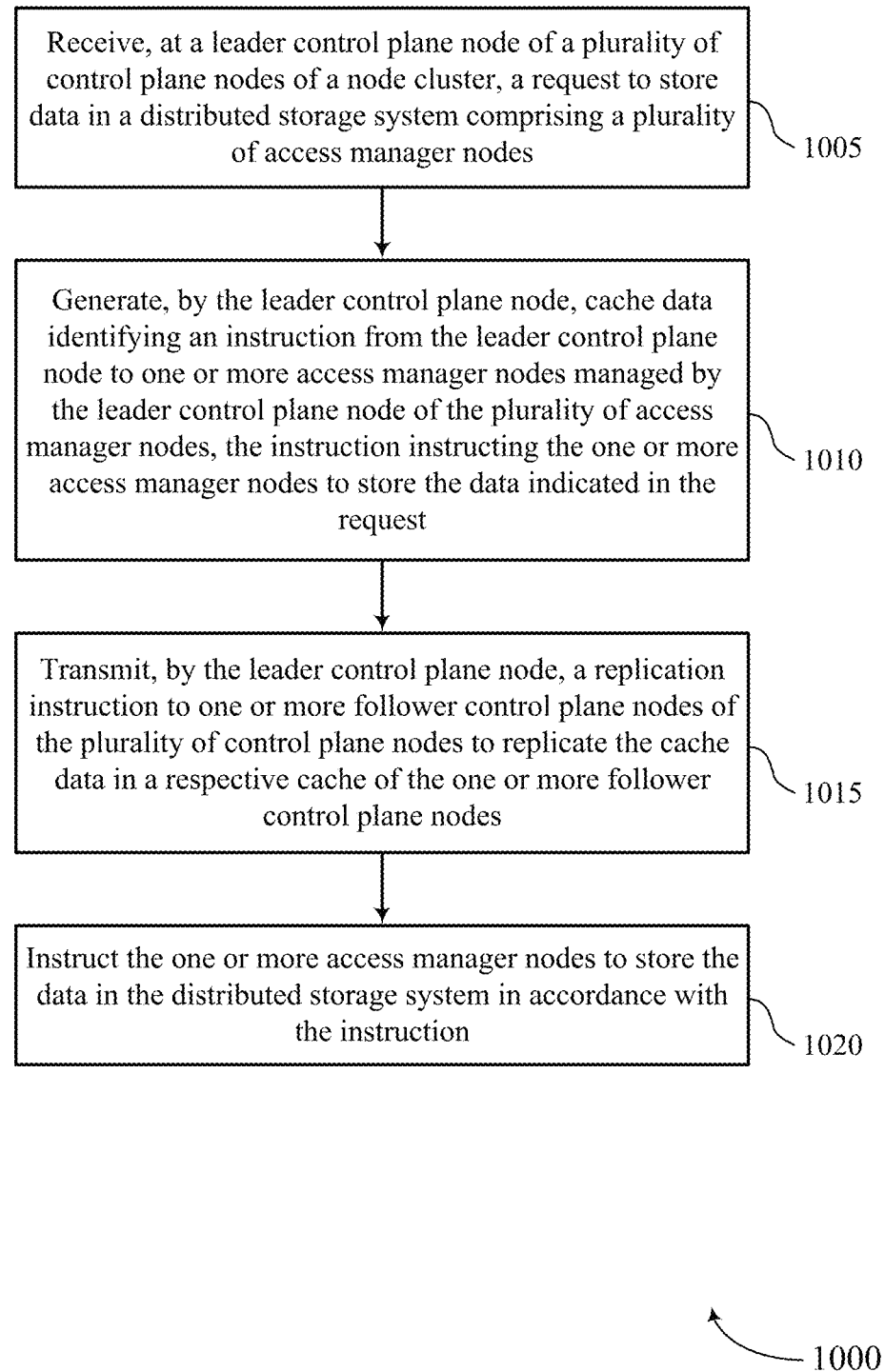

FIG. 10 shows a flowchart illustrating a method 1000 that supports techniques to achieve cache coherency across distributed storage clusters in accordance with aspects of the present disclosure. The operations of the method 1000 may be implemented by a storage architecture or its components as described herein. For example, the operations of the method 1000 may be performed by a storage architecture as described with reference to FIGS. 1 through 8. In some examples, a storage architecture may execute a set of instructions to control the functional elements of the storage architecture to perform the described functions. Additionally or alternatively, the storage architecture may perform aspects of the described functions using special-purpose hardware.

At 1005, the method may include receiving, at a leader control plane node of a plurality of control plane nodes of a node cluster, a request to store data in a distributed storage system comprising a plurality of access manager nodes. The operations of 1005 may be performed in accordance with examples as disclosed herein. In some examples, aspects of the operations of 1005 may be performed by a request component 725 as described with reference to FIG. 7.

At 1010, the method may include generating, by the leader control plane node, cache data identifying an instruction from the leader control plane node to one or more access manager nodes managed by the leader control plane node of the plurality of access manager nodes, the instruction instructing the one or more access manager nodes to store the data indicated in the request. The operations of 1010 may be performed in accordance with examples as disclosed herein. In some examples, aspects of the operations of 1010 may be performed by an instruction component 730 as described with reference to FIG. 7.

At 1015, the method may include transmitting, by the leader control plane node, a replication instruction to one or more follower control plane nodes of the plurality of control plane nodes to replicate the cache data in a respective cache of the one or more follower control plane nodes. The operations of 1015 may be performed in accordance with examples as disclosed herein. In some examples, aspects of the operations of 1015 may be performed by a replication instruction component 735 as described with reference to FIG. 7.

At 1020, the method may include instructing the one or more access manager nodes to store the data in the distributed storage system in accordance with the instruction. The operations of 1020 may be performed in accordance with examples as disclosed herein. In some examples, aspects of the operations of 1020 may be performed by an instruction component 730 as described with reference to FIG. 7.

Figure 11:
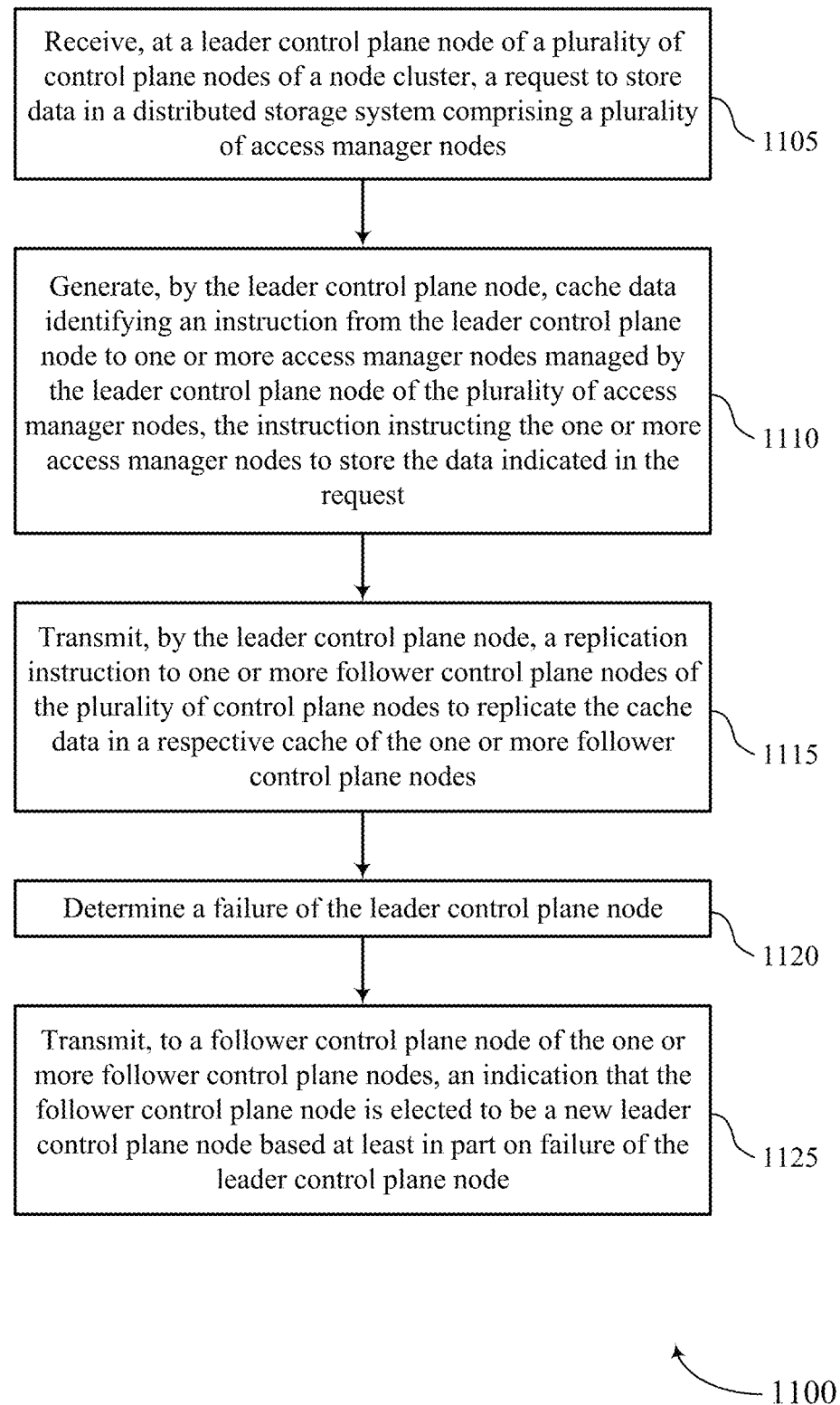

FIG. 11 shows a flowchart illustrating a method 1100 that supports techniques to achieve cache coherency across distributed storage clusters in accordance with aspects of the present disclosure. The operations of the method 1100 may be implemented by a storage architecture or its components as described herein. For example, the operations of the method 1100 may be performed by a storage architecture as described with reference to FIGS. 1 through 8. In some examples, a storage architecture may execute a set of instructions to control the functional elements of the storage architecture to perform the described functions. Additionally or alternatively, the storage architecture may perform aspects of the described functions using special-purpose hardware.

At 1105, the method may include receiving, at a leader control plane node of a plurality of control plane nodes of a node cluster, a request to store data in a distributed storage system comprising a plurality of access manager nodes. The operations of 1105 may be performed in accordance with examples as disclosed herein. In some examples, aspects of the operations of 1105 may be performed by a request component 725 as described with reference to FIG. 7.

At 1110, the method may include generating, by the leader control plane node, cache data identifying an instruction from the leader control plane node to one or more access manager nodes managed by the leader control plane node of the plurality of access manager nodes, the instruction instructing the one or more access manager nodes to store the data indicated in the request. The operations of 1110 may be performed in accordance with examples as disclosed herein. In some examples, aspects of the operations of 1110 may be performed by an instruction component 730 as described with reference to FIG. 7.

At 1115, the method may include transmitting, by the leader control plane node, a replication instruction to one or more follower control plane nodes of the plurality of control plane nodes to replicate the cache data in a respective cache of the one or more follower control plane nodes. The operations of 1115 may be performed in accordance with examples as disclosed herein. In some examples, aspects of the operations of 1115 may be performed by a replication instruction component 735 as described with reference to FIG. 7.

At 1120, the method may include determining a failure of the leader control plane node. The operations of 1120 may be performed in accordance with examples as disclosed herein. In some examples, aspects of the operations of 1120 may be performed by a failure component 750 as described with reference to FIG. 7.

At 1125, the method may include transmitting, to a follower control plane node of the one or more follower control plane nodes, an indication that the follower control plane node is elected to be a new leader control plane node based at least in part on failure of the leader control plane node. The operations of 1125 may be performed in accordance with examples as disclosed herein. In some examples, aspects of the operations of 1125 may be performed by a leader election component 740 as described with reference to FIG. 7.

Figure 12:
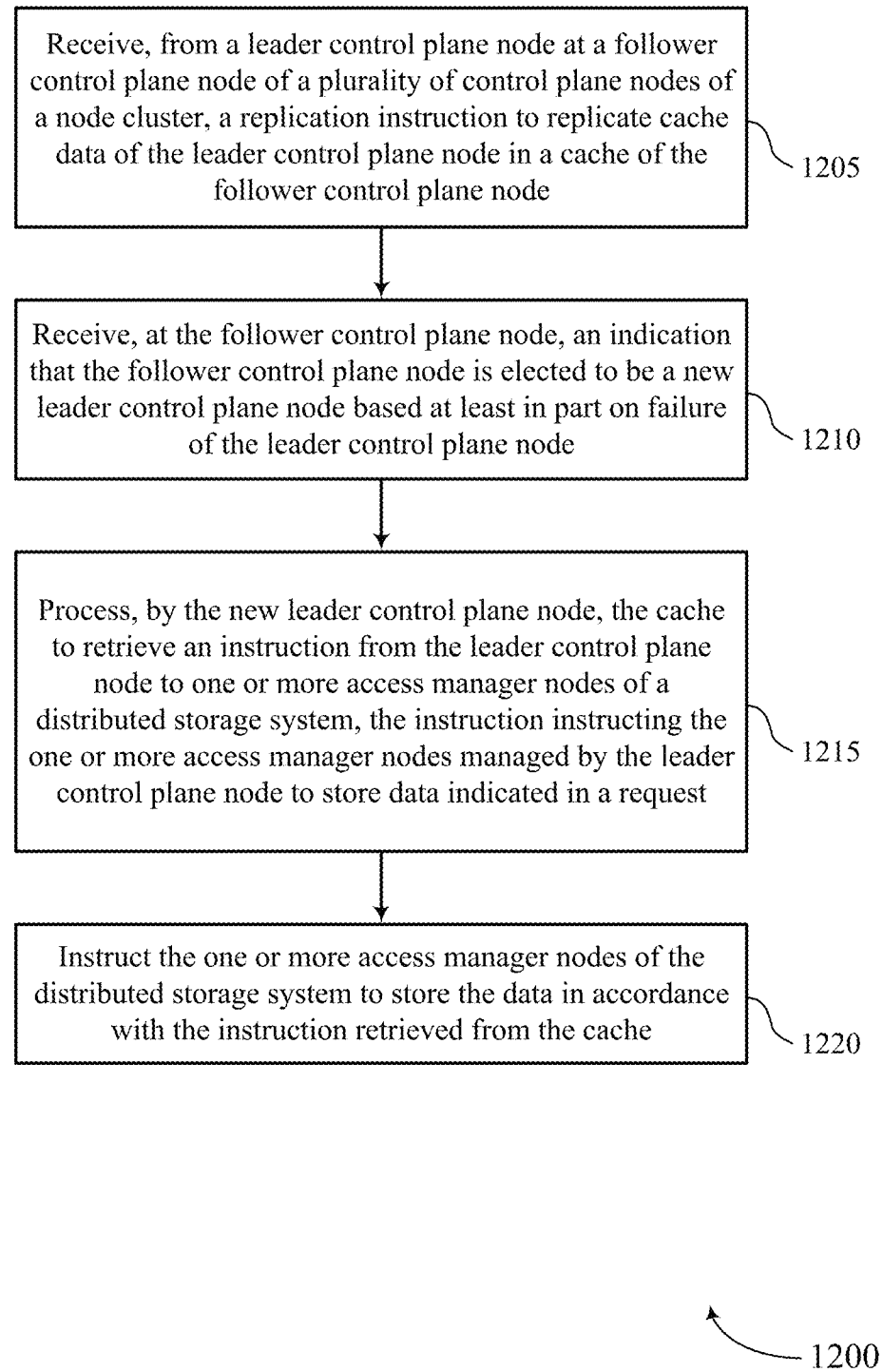

FIG. 12 shows a flowchart illustrating a method 1200 that supports techniques to achieve cache coherency across distributed storage clusters in accordance with aspects of the present disclosure. The operations of the method 1200 may be implemented by a storage architecture or its components as described herein. For example, the operations of the method 1200 may be performed by a storage architecture as described with reference to FIGS. 1 through 8. In some examples, a storage architecture may execute a set of instructions to control the functional elements of the storage architecture to perform the described functions. Additionally or alternatively, the storage architecture may perform aspects of the described functions using special-purpose hardware.

At 1205, the method may include receiving, from a leader control plane node at a follower control plane node of a plurality of control plane nodes of a node cluster, a replication instruction to replicate cache data of the leader control plane node in a cache of the follower control plane node. The operations of 1205 may be performed in accordance with examples as disclosed herein. In some examples, aspects of the operations of 1205 may be performed by a replication instruction component 735 as described with reference to FIG. 7.

At 1210, the method may include receiving, at the follower control plane node, an indication that the follower control plane node is elected to be a new leader control plane node based at least in part on failure of the leader control plane node. The operations of 1210 may be performed in accordance with examples as disclosed herein. In some examples, aspects of the operations of 1210 may be performed by a leader election component 740 as described with reference to FIG. 7.

At 1215, the method may include processing, by the new leader control plane node, the cache to retrieve an instruction from the leader control plane node to one or more access manager nodes of a distributed storage system, the instruction instructing the one or more access manager nodes managed by the leader control plane node to store data indicated in a request. The operations of 1215 may be performed in accordance with examples as disclosed herein. In some examples, aspects of the operations of 1215 may be performed by an instruction component 730 as described with reference to FIG. 7.

At 1220, the method may include instructing the one or more access manager nodes of the distributed storage system to store the data in accordance with the instruction retrieved from the cache. The operations of 1220 may be performed in accordance with examples as disclosed herein. In some examples, aspects of the operations of 1220 may be performed by an instruction component 730 as described with reference to FIG. 7.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A computer-implemented method for data storage, comprising:
   receiving, at a leader control plane node of a plurality of control plane nodes of a node cluster, a request to store data in a distributed storage system comprising a plurality of access manager nodes;
   generating, by the leader control plane node, cache data identifying an instruction from the leader control plane node to one or more access manager nodes managed by the leader control plane node of the plurality of access manager nodes, the instruction instructing the one or more access manager nodes to store the data indicated in the request;
   in response to receiving the request to store the data, appending a log entry to a log section of the leader control plane node, the log entry identifying the instruction to store the data indicated in the request;
   transmitting, by the leader control plane node, a replication instruction to one or more follower control plane nodes of the plurality of control plane nodes to replicate the cache data in a respective cache of the one or more follower control plane nodes; and
   in response to receiving, at the leader control plane node, responses from a majority of the one or more follower control plane nodes to the replication instruction, committing one or more log entries in the log section by the leader control plane node to reflect data indicated in a prior request to the plurality of access manager nodes.

2. The method of claim 1, further comprising:
instructing the one or more access manager nodes to store the data in the distributed storage system in accordance with the instruction.

3. The method of claim 1, wherein generating the cache data further comprises:
creating, in a cache of the leader control plane node, a replication log entry comprising the instruction for storing the data indicated in the request by the one or more access manager nodes of the distributed storage system.

4. The method of claim 3, further comprising:
receiving, from the one or more access manager nodes, a confirmation message indicating that the data indicated in the request has been stored data by the one or more access manager nodes; and
updating the replication log entry of the cache to indicate that the data indicated in the request has been stored data by the one or more access manager nodes of the distributed storage system.

5. The method of claim 1, further comprising:
determining a failure of the leader control plane node; and
transmitting, to a follower control plane node of the one or more follower control plane nodes, an indication that the follower control plane node is elected to be a new leader control plane node based at least in part on failure of the leader control plane node.

6. The method of claim 1, wherein the cache data indicates one or more access manager nodes of the distributed storage system managed by the leader control plane node, or one or more storage volumes of the distributed storage system managed by the leader control plane node, or one or more storage pools of the distributed storage system managed by the leader control plane node, or any combination thereof.

7. The method of claim 1, comprising:
after committing the one or more log entries, replicating a committed log number to the one or more follower control plane nodes to cause the one or more follower control plane nodes to commit a log corresponding to the committed log number;
maintaining a randomized timer at the one or more follower control plane nodes, the randomized timer being reset when the one or more follower control plane nodes receive an update from the leader control plane node; and
in response to determining that the randomized timer has expired at the one or more follower control plane nodes, determining that the leader control plane node has failed and requesting a vote on election of a next leader.

8. A computer-implemented method for data storage, comprising:
receiving, from a leader control plane node at a follower control plane node of a plurality of control plane nodes of a node cluster, a replication instruction to replicate cache data of the leader control plane node in a cache of the follower control plane node;
receiving, at the follower control plane node, an indication that the follower control plane node is elected to be a new leader control plane node based at least in part on failure of the leader control plane node;
processing, by the new leader control plane node, the cache to retrieve an instruction from the leader control plane node to one or more access manager nodes of a distributed storage system, the instruction instructing the one or more access manager nodes managed by the leader control plane node to store data indicated in a request;
instructing the one or more access manager nodes of the distributed storage system to store the data in accordance with the instruction retrieved from the cache; and
in response to receiving, at the new leader control plane node, responses from a majority of the one or more access manager nodes, committing one or more log entries in a log section by the new leader control plane node to reflect data indicated in a prior request.

9. The method of claim 8, further comprising:
processing the cache to identify a replication log entry comprising the instruction for storing the data indicated in the request via the one or more access manager nodes of the distributed storage system, and
instructing the one or more access manager nodes of the distributed storage system to store the data indicated in the request based at least in part on the replication log entry.

10. The method of claim 9, further comprising:
receiving, from the one or more access manager nodes, a confirmation message indicating that the data indicated in the request has been stored data by the one or more access manager nodes.

11. The method of claim 8, further comprising:
receiving, at the new leader control plane node, a second request to store data in the one or more access manager nodes;
generating, by the new leader control plane node, a second cache data identifying a second instruction from the new leader control plane node to the one or more access manager nodes, the second instruction instructing the one or more access manager nodes to store the data indicated in the second request; and
transmitting, by the new leader control plane node, a second replication instruction to one or more follower control plane nodes of the new leader control plane node to replicate the second cache data in a respective cache of the one or more follower control plane nodes.

12. The method of claim 11, further comprising:
instructing the one or more access manager nodes to store the data in the distributed storage system in accordance with the second instruction.

13. The method of claim 8, wherein the cache data indicates one or more access manager nodes of the distributed storage system managed by the leader control plane node, or one or more storage volumes of the distributed storage system managed by the leader control plane node, or one or more storage pools of the distributed storage system managed by the leader control plane node, or any combination thereof.

14. The method of claim 8, wherein a second cache of the new leader control plane node is configured to achieve cluster fail over within a defined amount of time.

15. An apparatus for data storage, comprising:
at least one processor;
memory coupled with the at least one processor; and
instructions stored in the memory and executable by the at least one processor to cause the apparatus to:
receive, at a leader control plane node of a plurality of control plane nodes of a node cluster, a request to store data in a distributed storage system comprising a plurality of access manager nodes;

generate, by the leader control plane node, cache data identifying an instruction from the leader control plane node to one or more access manager nodes managed by the leader control plane node of the plurality of access manager nodes, the instruction instructing the one or more access manager nodes to store the data indicated in the request;

transmit, by the leader control plane node, a replication instruction to one or more follower control plane nodes of the plurality of control plane nodes to replicate the cache data in a respective cache of the one or more follower control plane nodes; and in response to receiving, at the leader control plane node, responses from a majority of the one or more follower control plane nodes to the replication instruction, committing one or more log entries in a log section by the leader control plane node to reflect data indicated in a prior request to the plurality of access manager nodes.

16. The apparatus of claim 15, wherein the instructions are further executable by the processor to cause the apparatus to:

instruct the one or more access manager nodes to store the data in the distributed storage system in accordance with the instruction.

17. The apparatus of claim 15, wherein the instructions to generate the cache data are further executable by the processor to cause the apparatus to:

create, in a cache of the leader control plane node, a replication log entry comprising the instruction for storing the data indicated in the request by the one or more access manager nodes of the distributed storage system.

18. The apparatus of claim 17, wherein the instructions are further executable by the processor to cause the apparatus to:

receive, from the one or more access manager nodes, a confirmation message indicating that the data indicated in the request has been stored data by the one or more access manager nodes; and update the replication log entry of the cache to indicate that the data indicated in the request has been stored data by the one or more access manager nodes of the distributed storage system.

19. The apparatus of claim 15, wherein the instructions are further executable by the processor to cause the apparatus to:

determine a failure of the leader control plane node; and transmit, to a follower control plane node of the one or more follower control plane nodes, an indication that the follower control plane node is elected to be a new leader control plane node based at least in part on failure of the leader control plane node.

20. The apparatus of claim 15, wherein the cache data indicates one or more access manager nodes of the distributed storage system managed by the leader control plane node, or one or more storage volumes of the distributed storage system managed by the leader control plane node, or one or more storage pools of the distributed storage system managed by the leader control plane node, or any combination thereof.

* * * * *